(12) United States Patent
Hirabayashi et al.

(10) Patent No.: US 12,438,417 B2
(45) Date of Patent: *Oct. 7, 2025

(54) ROTATING DEVICE

(71) Applicant: MINEBEA MITSUMI Inc., Nagano (JP)

(72) Inventors: Koichiro Hirabayashi, Nagano (JP); Yukimasa Matsumura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,591

(22) Filed: Jun. 29, 2022

(65) Prior Publication Data

US 2022/0329131 A1   Oct. 13, 2022

Related U.S. Application Data

(63) Continuation of application No. 16/645,546, filed as application No. PCT/JP2018/031809 on Aug. 28, 2018, now Pat. No. 11,411,466.

(30) Foreign Application Priority Data

Sep. 13, 2017 (JP) ................. 2017-176231

(51) Int. Cl.
*H02K 7/11* (2006.01)
*F16H 55/06* (2006.01)
(Continued)

(52) U.S. Cl.
CPC ........... *H02K 7/1166* (2013.01); *F16H 55/06* (2013.01); *F16H 57/02* (2013.01); *H02K 5/225* (2013.01);
(Continued)

(58) Field of Classification Search
CPC ........ H02K 11/00; H02K 11/21; H02K 11/23; H02K 11/30; H02K 11/38; H02K 7/00;
(Continued)

(56) References Cited

U.S. PATENT DOCUMENTS 6,169,346 B1   1/2001   Nakamura et al.
6,404,084 B1   6/2002   Niki et al.
(Continued)

FOREIGN PATENT DOCUMENTS

CN   104517685 A1   4/2015
EP   0 926 804 A1   6/1999
(Continued)

OTHER PUBLICATIONS

Notice of Reasons for Refusal dated Mar. 28, 2023 for corresponding Japanese Application No. 2022-063722 and English translation.
(Continued)

*Primary Examiner* — Tran N Nguyen
(74) *Attorney, Agent, or Firm* — Chrisman Gallo Tochtrop LLC

(57) ABSTRACT

A rotating device 1 according to the present application includes a motor 3, a gear 5 that transmits rotation of the motor 3 to an external device, and a sensor 7. The sensor 7 includes a sensor part 70 and a housing 72 that accommodates the sensor part 70. The sensor part 70 is capable of detecting a rotational speed or a rotational angle of the gear 5. The gear 5 includes a recess 50 in a rotational axis direction of the gear 5. The recess 50 accommodates a part of the housing 72.

7 Claims, 17 Drawing Sheets

(51) Int. Cl.
- *F16H 57/02* (2012.01)
- *H02K 5/22* (2006.01)
- *H02K 7/116* (2006.01)
- *H02K 11/23* (2016.01)
- *F16H 1/20* (2006.01)

(52) U.S. Cl.
CPC .............. *H02K 11/23* (2016.01); *F16H 1/203* (2013.01); *F16H 2057/02034* (2013.01)

(58) Field of Classification Search
CPC ........ H02K 7/11; H02K 7/116; H02K 7/1166; H02K 5/00; H02K 5/08; H02K 5/22; H02K 5/225
See application file for complete search history.

(56) References Cited

U.S. PATENT DOCUMENTS

| | | | |
|---|---|---|---|
| 7,078,891 | B2 | 7/2006 | Su et al. |
| 11,411,466 | B2 * | 8/2022 | Hirabayashi ............ F16H 55/06 |
| 2006/0096400 | A1 | 5/2006 | Shinmura et al. |
| 2008/0224553 | A1 | 9/2008 | Abe et al. |
| 2008/0291650 | A1 | 11/2008 | Hautvast et al. |

FOREIGN PATENT DOCUMENTS

| | | |
|---|---|---|
| JP | H01-099006 U | 7/1989 |
| JP | H04-119343 U | 10/1992 |
| JP | 2002-291194 A | 10/2002 |
| JP | 2004-166320 A | 6/2004 |
| JP | 2007-010779 A | 1/2007 |
| JP | 2007-116875 A | 5/2007 |
| JP | 2007-535805 A | 12/2007 |
| JP | 2013-005512 A | 1/2013 |
| JP | 2013-046458 A | 3/2013 |
| JP | 2014-087140 A | 5/2014 |
| JP | 2015-231256 A | 12/2015 |

OTHER PUBLICATIONS

International Search Report for corresponding International Application No. PCT/JP2018/031809 mailed Oct. 9, 2018.
Written Opinion for corresponding International Application No. PCT/JP2018/031809 dated Oct. 9, 2018 and English translation.
Extended European Search Report dated Apr. 26, 2021 for corresponding European Application No. 18856499.1.
Notice of Reasons for Refusal mailed Aug. 3, 2021 for corresponding Japanese Application No. 2017-176231 and English translation.
Chinese Office Action dated Sep. 2, 2021 for corresponding Chinese Application No. 201880058658.4 and English translation.
Notice of Reasons for Refusal dated Jun. 5, 2024 for corresponding Japanese Application No. 2024-027312 and English translation.
Notice of Reasons for Refusal dated May 22, 2024 for corresponding Japanese Application No. 2023-174043 and English translation.
Notice of Reasons for Refusal dated Oct. 23, 2024 for corresponding Japanese Application No. 2024-027312 and English translation.

* cited by examiner

ROTATING DEVICE

CROSS-REFERENCE TO RELATED APPLICATIONS

This application is a Continuation of U.S. application Ser. No. 16/645,546, filed on Mar. 9, 2020, which was a national stage entry of PCT/JP2018/031809, filed on Aug. 28, 2018, that claims the benefit of Japanese Application No. 2017-176231, filed Sep. 13, 2017, the entire disclosures of which are hereby incorporated herein by reference.

FIELD

The present invention relates to a rotating device.

BACKGROUND

Rotating devices (motor actuators) are conventionally available and each include a motor, an output gear, and a sensor for detecting a rotational position (rotational angle) of the output gear, being capable of, for example, driving a plurality of switching doors (louvers) provided in an air passage of a vehicle air conditioner system (refer, for example, to Patent Literature 1).

CITATION LIST

Patent Literature

Patent Literature 1: Japanese Patent Application Laid-open No. 2013-5512

SUMMARY

Technical Problem

However, an arrangement of a sensor disclosed in Patent Literature 1 mentioned above may increase a thickness of a rotating device.

The present invention treats the above-described problem as an example of problems, and an object of the present invention is to provide a rotating device capable of being reduced in thickness.

Solution to Problem

In order to achieve the above object, the present invention is grasped by the following constitution. A rotating device according to the present invention includes a motor, a gear that transmits rotation of the motor to an external device, and a sensor. The sensor includes a sensor part and a housing that accommodates the sensor part. The sensor part is capable of detecting a rotational angle of the gear. The gear includes a recess in a rotational axis direction. A part of the housing is accommodated in the recess.

DESCRIPTION OF EMBODIMENTS

The following describes modes (hereinafter, called "embodiments") for carrying out the present invention will be described in detail based on the accompanying drawings. The same components are denoted by the same reference signs throughout the description of the embodiments.

First Embodiment

Figure 1:
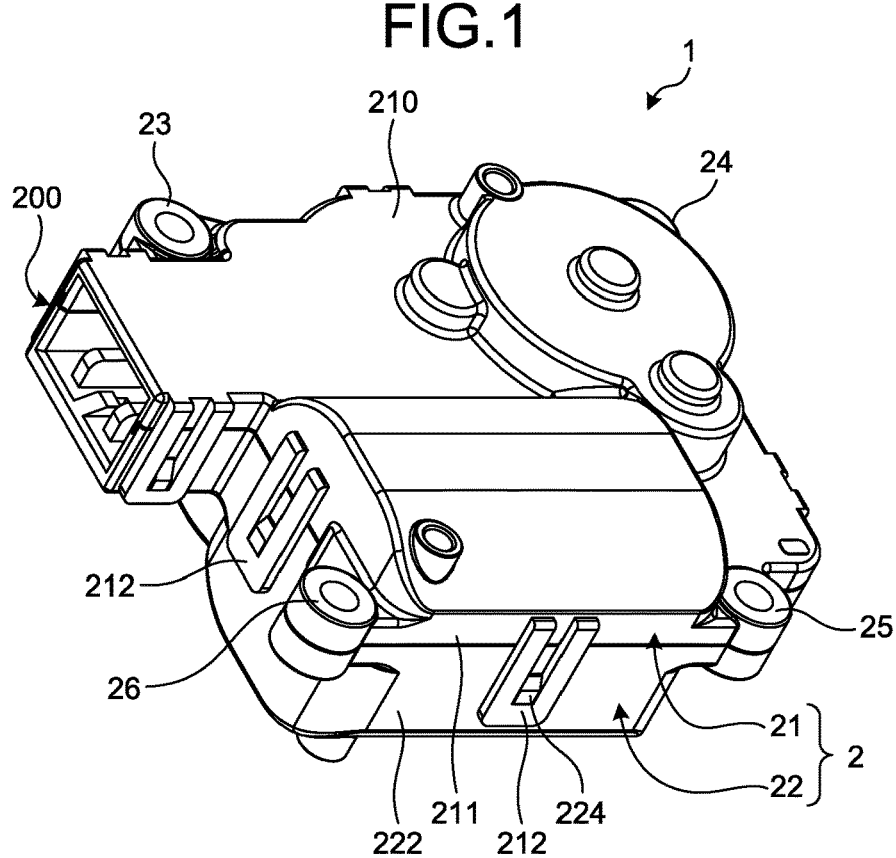
FIG. 1 is a perspective view of a rotating device according to a first embodiment.
Figure 2:
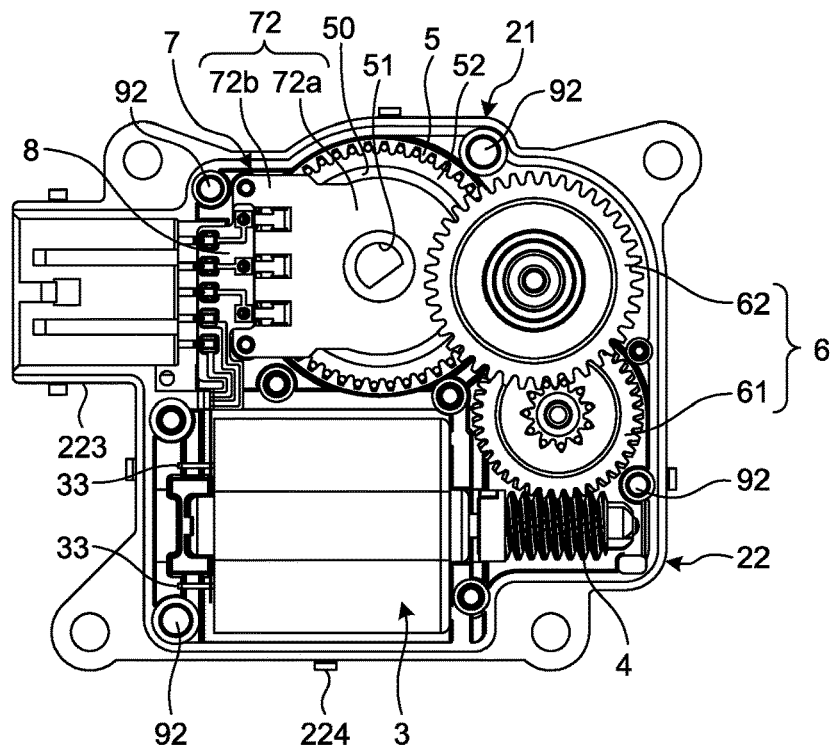
FIG. 2 is a plan view of the rotating device according to the first embodiment with a first casing removed from the rotating device.
Figure 3:
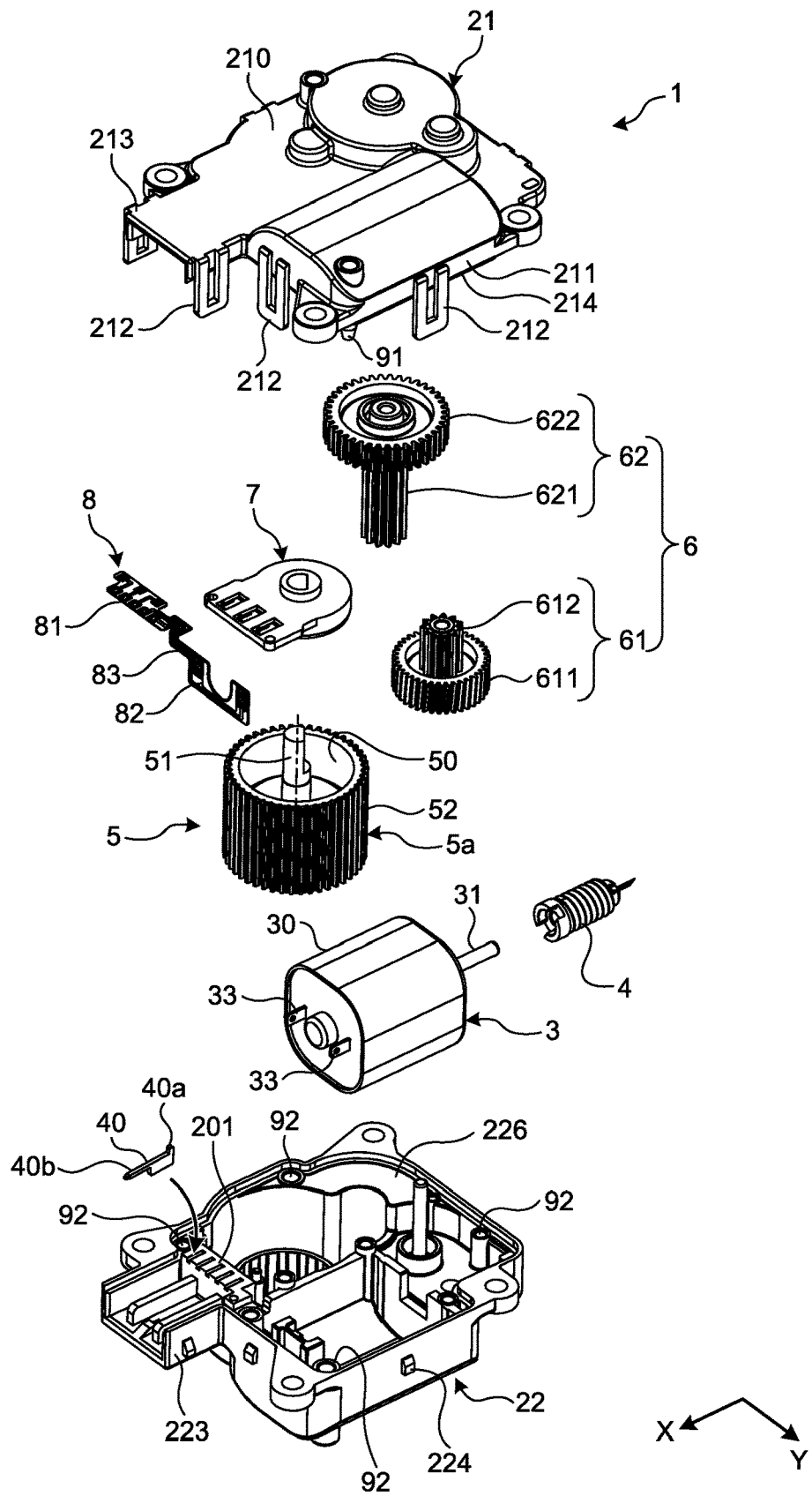
FIG. 3 is an exploded perspective view of the rotating device according to the first embodiment.
Figure 4:
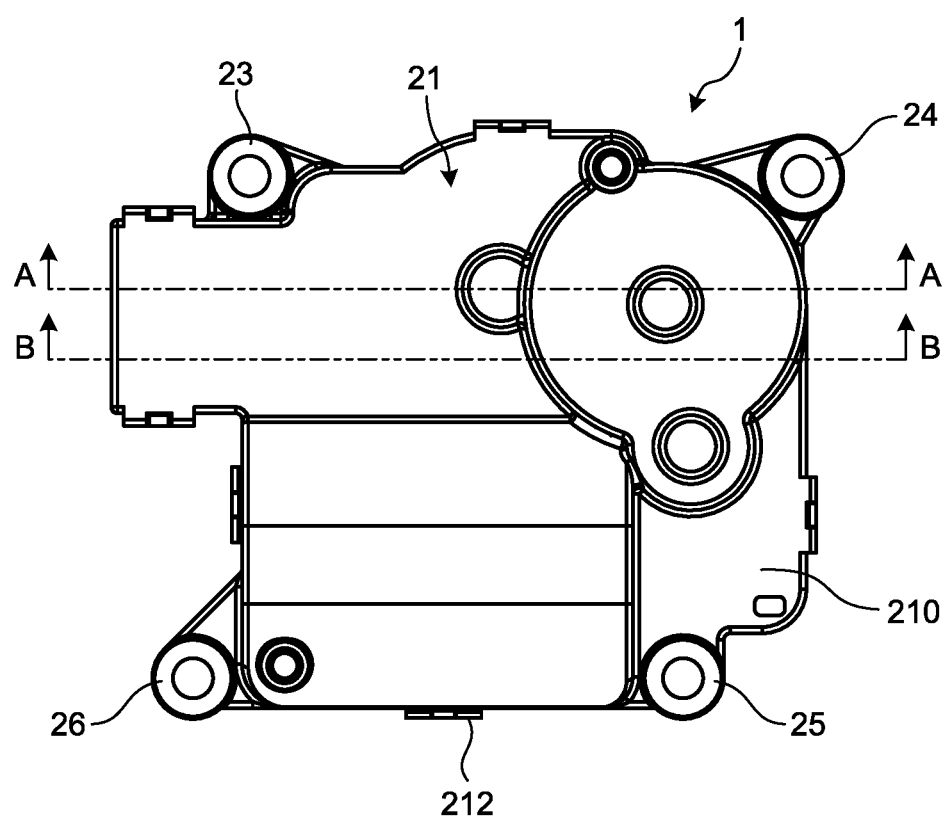
FIG. 4 is a plan view of the rotating device according to the first embodiment.
Figure 5A:
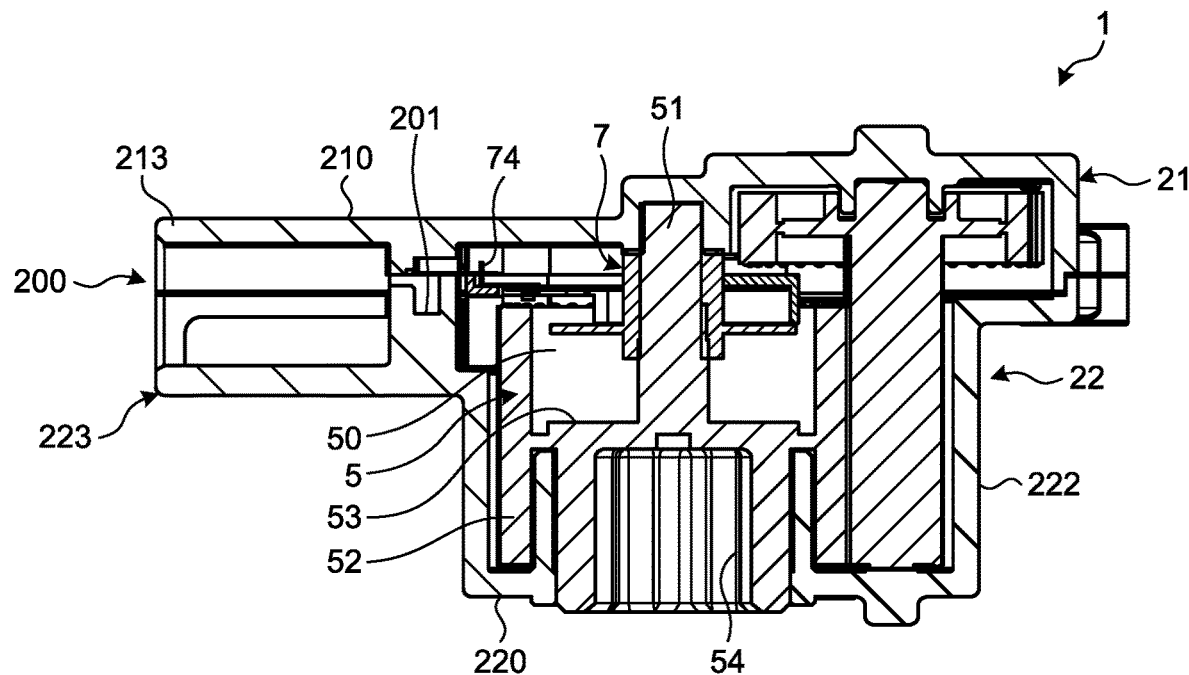
FIG. 5A is a sectional view taken along line A-A in FIG. 4.
Figure 5B:
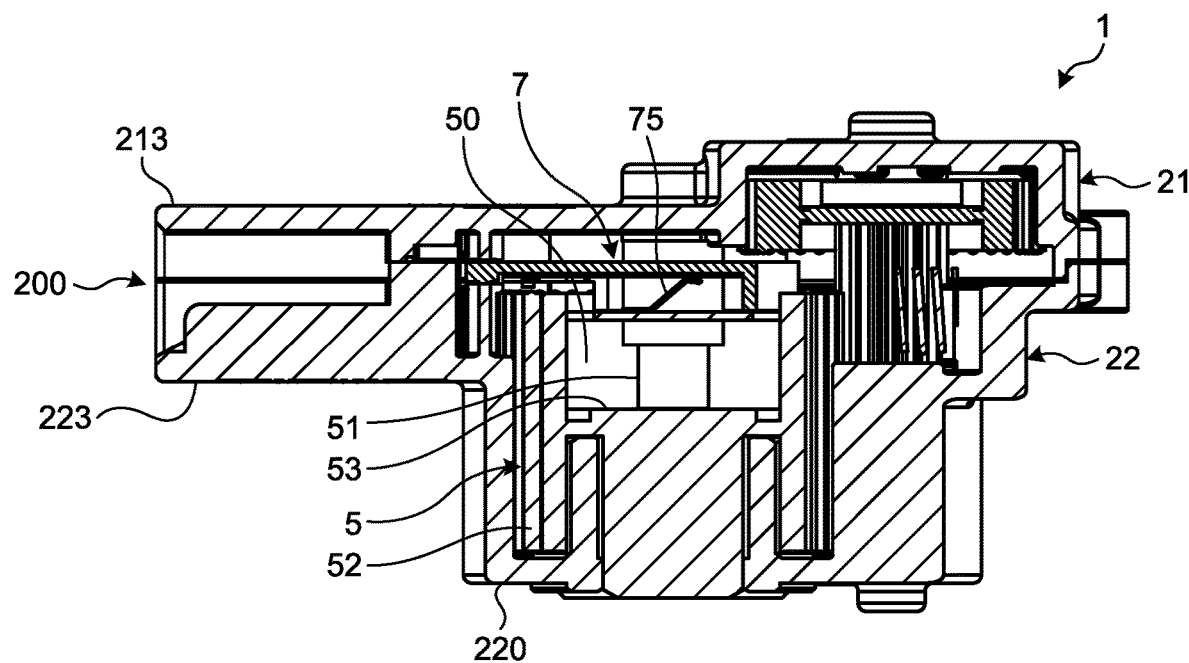
FIG. 5B is a sectional view taken along line B-B in FIG. 4.
Figure 19:
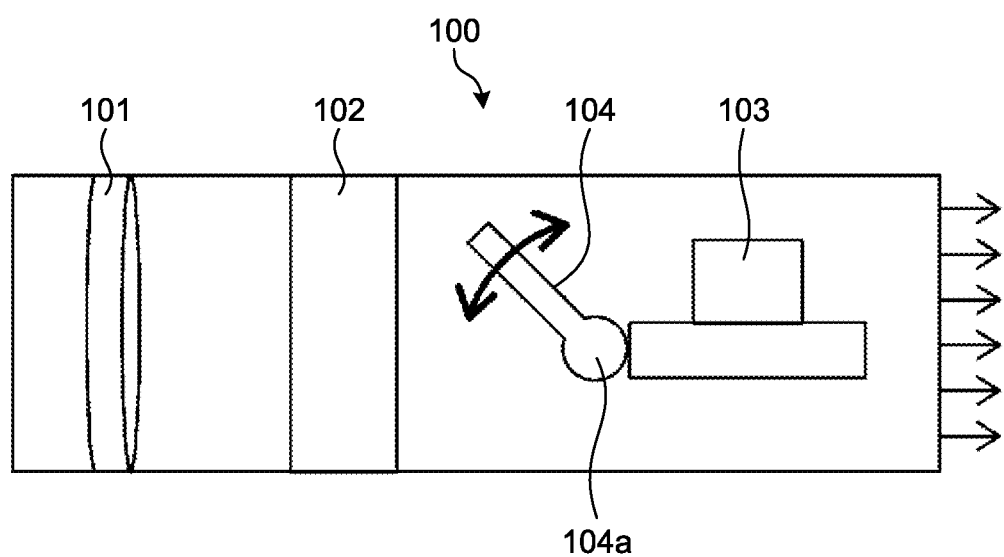
FIG. 19 is a schematic explanatory view illustrating an air conditioning system including the rotating device according to any one of the embodiments.

FIG. 1 is a perspective view of a rotating device according to a first embodiment of the present invention, and FIG. 2 is a plan view of the rotating device according to the first embodiment with a first casing removed from the rotating device. FIG. 3 is an exploded perspective view of the rotating device according to the first embodiment, and FIG. 4 is a plan view of the rotating device according to the first embodiment. FIG. 5A is a sectional view taken along line A-A in FIG. 4, and FIG. 5B is a sectional view taken along line B-B in FIG. 4. FIG. 19 is a schematic explanatory view illustrating an air conditioning system including the rotating device according to any one of the embodiments.

A rotating device 1 according to any one of the embodiments is used in, for example, a vehicle air conditioning system 100 illustrated in FIG. 19, and can control a rotational operation of a louver 104 for controlling, for example, an air volume. The vehicle air conditioning system 100 includes a blower fan 101, an evaporator 102 for cooling air delivered from the blower fan 101, and a heater 103 disposed downstream of the evaporator 102. The louver 104 is disposed between the evaporator 102 and the heater 103 to control an amount of supply of the air flowing from the evaporator 102 side toward the heater 103 side, and the rotating device 1 rotates a drive shaft 104a of the louver 104.

As illustrated in FIG. 1, the rotating device 1 includes a casing 2 that accommodates a functional part. The functional part is specifically constituted by, for example, a motor 3, a plurality of transmission gears 6, an output gear 5, and a sensor 7 to each be described later.

The casing 2 is configured by connecting a first casing 21 including an opening to a second casing 22 including an opening in a state where the openings face each other. The first casing 21 includes a first surface portion 210 serving as a top surface of the casing 2, a first sidewall 211 provided at an outer circumferential portion of the first surface portion 210, and an opening 214 surrounded by the first sidewall 211. The second casing 22 includes a second surface portion 220 serving as a bottom of the casing 2 (refer to FIGS. 5A and 5B), a second sidewall 222 provided at an outer circumferential portion of the second surface portion 220, and an opening 226. The casing 2 is made of a resin material, such as polypropylene, polyethylene terephthalate, or acrylonitrile butadiene styrene (ABS).

A plurality of engagement portions 212 are integrally provided at an outer circumference of the first sidewall 211 of the first casing 21 so as to extend toward the second casing 22, and the engagement portions 212 are each provided with a hole (hereinafter, called an engagement hole). As illustrated in FIGS. 2 and 3, a plurality of projections (hereinafter, called engagement projections 224) respectively corresponding to the plurality of engagement portions 212 of the first casing 21 are integrally provided at the second sidewall 222 of the second casing 22. The engagement projections 224 engage with the engagement holes of the engagement portions 212.

In other words, the first casing 21 and the second casing 22 are brought together so as to engage the engagement holes of the engagement portions 212 of the first casing 21 with the engagement projections 224 of the second casing 22. Accordingly, the first casing 21 is integrated with the second casing 22 to configure the casing 2 (refer to FIG. 1) that accommodates the functional part including the various components illustrated in FIGS. 2 and 3.

In the present embodiment, the first casing 21 is provided with the engagement portions 212, and the second casing 22 is provided with the engagement projections 224. However, the second casing 22 may be provided with the engagement portions 212, and the first casing 21 may be provided with the engagement projections 224.

Although details will be described later, the first casing 21 is provided with a plurality of projections 91 (refer to FIG. 3), and the second casing 22 is provided with a plurality of through-holes 92 corresponding to the respective projections 91. The projections 91 fit in the respective through-holes 92 in a state where the first casing 21 and the second casing 22 have butted each other and have been joined to be integrated. The projections 91 and the through-holes 92 extend in a rotational axis direction of the transmission gears 6 or the output gear 9.

As illustrated in FIGS. 3, 5A, and 5B, the first casing 21 and the second casing 22 are respectively provided with projecting portions 213 and 223 corresponding to each other. In the present embodiment, the projecting portions 213 and 223 project in a lengthwise direction of a rotating shaft of the motor 3, or a first connection terminal 74 or a second connection terminal 40 (to be described later) extending. The projecting portions 213 and 223 are joined to provide a connector portion 200 (FIG. 1).

As illustrated in FIG. 3, the connector portion 200 is provided with concave holding portions 201 for holding a plurality of the second connection terminals 40 electrically connected to the first connection terminals 74 (FIG. 5A) included in the sensor 7 (to be described later). As illustrated, a first end portion of the second connection terminal 40 is provided with an upward projecting piece 40a. The piece 40a is paired with a distal end portion of the connection terminal 74 of the sensor 7 (to be described later). While, for the sake of convenience, FIG. 3 illustrates a state where one of the second connection terminals 40 is removed from the holding portions 201, a plurality (three to five) of the second connection terminals 40 are provided as required.

As illustrated in FIG. 1, an outer circumference of the first casing 21 is provided with four mounting portions 23, 24, 25, and 26 for mounting the rotating device 1 in a predetermined position when the rotating device 1 is installed in, for example, the air conditioning system.

As illustrated in FIGS. 2 and 3, the rotating device 1 includes, as the various components constituting the functional part accommodated in the casing 2, the motor 3, the output gear 5 for mechanically outputting rotation of a rotating shaft 31 of the motor 3 to an external device, the plurality of transmission gears 6 for transmitting the rotation of the motor 3 to the output gear 5, and the sensor 7 for detecting a rotational angle of the output gear 5. The sensor 7 includes a sensor part 70 (refer to FIG. 7B) to be described later and a case for accommodating the sensor part 70 (hereinafter, called a sensor housing 72). The rotating device 1 can control the rotation of the motor 3 based on the rotational angle of the output gear 5 detected by the sensor part 70.

The plurality of transmission gears 6 include a first transmission gear 61 and a second transmission gear 62 both configured to include multiple stages. A plurality of gears mesh with one another to transmit the rotation of the rotating shaft 31 of the motor 3 to an output shaft 51 of the output gear 5.

As illustrated in FIGS. 2 and 3, the rotating device 1 according to the present embodiment includes a flexible wiring board 8 as a circuit board for electrically connecting the second connection terminals 40 to the motor 3 and the sensor 7. Input-output signals for driving the motor 3 and a signal from the sensor 7 corresponding to the rotational angle of the output gear 5 can be externally obtained through the wiring board 8 and the second connection terminals 40. The term "electrically connect" refers to a concept including a case of directly connecting two members and a case of connecting the two members via another member. The circuit board is included in the concept of a connecting member (to be described later).

The following more specifically describes the components constituting the functional part.

(Motor 3)

The motor 3 is a drive device for rotating the output gear 5. In the present embodiment, a direct-current (DC) motor is used as the motor 3. As illustrated in FIG. 3, the motor 3 includes a body 30 including an outer shell (frame) with a quadrangular prismatic outer shape including curved corners, the rotating shaft 31, and a pair of terminals 33, 33. The body 30 includes two side faces serving as a top surface and a bottom surface arranged in the rotational axis direction. A part (including an end portion) of the rotating shaft 31 is led out of one of the side faces (top surface) of the body 30. The pair of terminals 33, 33 are provided on the other side face (bottom surface) in the rotational axis direction. A part on one side of the rotating shaft 31 is fixed to a rotor (not illustrated) accommodated in the body 30 of the motor 3, and a worm gear 4 is mounted on a part on the other end portion side of the rotating shaft 31 projecting from the body 30.

(Transmission Gears 6)

The transmission gears 6 are gears for transmitting the rotation of the rotating shaft 31 of the motor 3 to the output gear 5 at a predetermined reduction ratio (gear ratio). In the present embodiment, as described above, the transmission gears 6 include the first transmission gear 61 and the second transmission gear 62 both include multiple stages. The transmission gears may include the worm gear 4 mounted on the rotating shaft 31 of the motor 3.

Specifically, as illustrated in FIG. 3, the transmission gears 6 include the first transmission gear 61 including a first large diameter portion 611 and a first small diameter portion 612, and the second transmission gear 62 including a second small diameter portion 621 and a second large diameter portion 622. The first large diameter portion 611 is formed to include a diameter larger than the diameter of the first small diameter portion 612. The same also applies to the relation between the second large diameter portion 622 and the second small diameter portion 621.

The first large diameter portion 611 of the first transmission gear 61 meshes with the worm gear 4 mounted on the rotating shaft 31 of the motor 3. The first small diameter portion 612 of the first transmission gear 61 meshes with the second large diameter portion 622 of the second transmission gear 62, and the second small diameter portion 621 of the second transmission gear 62 meshes with the output gear 5. In this way, the meshing of the plurality of gears causes the rotation of the rotating shaft 31 of the motor 3 to be transmitted to the output shaft 51 of the output gear 5 at the predetermined reduction ratio.

In the present embodiment, the two gears of the first transmission gear 61 and the second transmission gear 62 each include multiple stages are used so as to transmit the rotation of the rotating shaft 31 of the motor 3 to the output gear 5 while adjusting the gear ratio using a small space. However, different designs are also possible, for example, the first small diameter portion 612 with a smaller-diameter of the first transmission gear 61 may mesh with the output gear 5 without using the second transmission gear 62, or the worm gear 4 may directly mesh with the output gear 5 without using either of the first transmission gear 61 or the second transmission gear 62.

(Output Gear 5)

The output gear 5 includes a recess 50 in a rotational axis direction (in a direction of extension of the output shaft 51 serving as a rotational axis). Specifically, as illustrated in FIG. 3, the output gear 5 includes a gear body 5a including an outer circumferential surface and the recess 50. The outer circumferential surface is provided with a tooth row 52. The gear body 5a includes a tubular shape. A part of the sensor 7 is accommodated in the recess 50 formed in the gear body 5a.

Specifically, as illustrated in FIGS. 5A and 5B, the gear body 5a includes, in the direction of extension of the output shaft 51 passing through a center of the gear body 5a, the recess 50 including: a bottom and an inner wall surface formed on a side face of the gear body 5a; and an opening surrounded by the inner wall surface. A part of the sensor housing 72 accommodating the sensor part 70 is accommodated on an upper side of the recess 50, that is, in a position of the recess 50 facing the first surface portion 210 of the first casing 21.

As described above, the second transmission gear 62 is the multi-stage gear including the second large diameter portion 622 and the second small diameter portion 621, the rotation being transmitted from the motor 3 to the second large diameter portion 622 and the second small diameter portion 621 extending from the second large diameter portion 622 and transmitting the rotation to the output gear 5. The second large diameter portion 622 of the second transmission gear 62 is disposed so as to partially overlap the output gear 5 in the rotational axis direction of the output gear 5 (refer to FIG. 2). Accordingly, the sensor housing 72 is disposed between the second large diameter portion 622 of the second transmission gear 62 and the output gear 5.

An upper and lower positional relation is expressed here based on a state where the first casing 21 of the rotating device 1 is located on a relatively upper side and the second casing 22 of the rotating device 1 is located on a relatively lower side.

An upper end portion (one end portion) of the output shaft 51 includes a D-shaped sectional shape, and is formed in a shape fittable in a rotating plate 71 (to be described later). A lower half portion of the output gear 5 is formed to include a diameter larger than the diameter of an upper half portion of the output gear 5. An inner circumferential surface of the lower half portion is provided with an engagement portion 54 that engages with an external shaft of, for example, the above-described drive shaft 104a of the louver 104 of the air conditioning system 100. Accordingly, rotating the output gear 5 can control the rotational operation of the louver 104, and can adjust, for example, the air volume of the air conditioning system 100 (refer to FIG. 19).

As described above, the output gear 5 is connected to the drive shaft 104a of the louver 104 of the air conditioning system 100 mounted on, for example, a vehicle. In other words, the output gear 5 is a gear for outputting torque of the rotating shaft 31 of the motor 3 as a drive force for controlling the drive shaft 104a of the louver 104. However, the present invention is not necessarily limited to the aspect of directly connecting a shaft to be rotated, such as the drive shaft 104a of the louver 104, to the output gear 5. For example, an aspect of interposing a gear as another member between the rotating device 1 and the shaft to be rotated may be available. In that case, a rotating shaft of the interposed gear may be connected to the output gear 5.

(Sensor 7)

As described above, the air conditioning system 100 (refer to FIG. 19) or the like mounted on, for example, an automobile, includes the louver 104. The sensor 7 can be used to detect the rotational angle of the output gear 5 in order to drive the louver 104 into a predetermined state.

To reduce the thickness of the rotating device 1, a brush 75 of the sensor 7 according to the present embodiment providing a thickness in the height direction is accommodated in the sensor housing 72 so as to achieve a reduction in thickness of the rotating device 1, although the sensor 7 is thickened.

Figure 6:
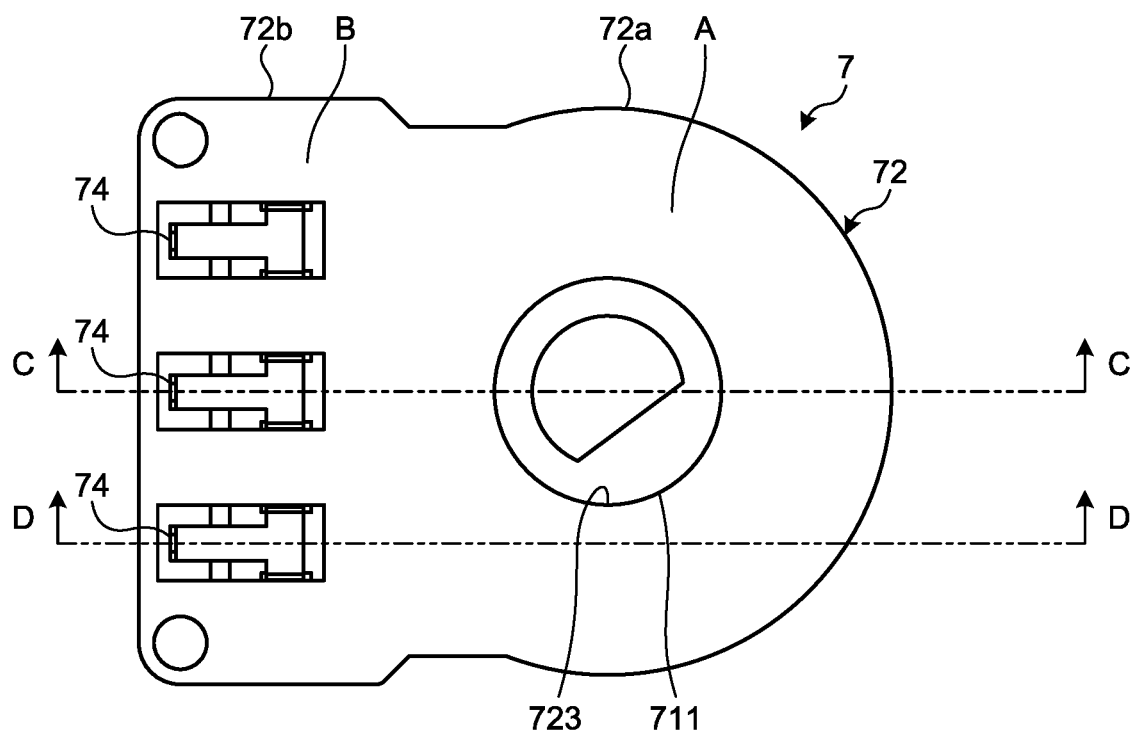
FIG. 6 is a plan view of a sensor housing.
Figure 7A:
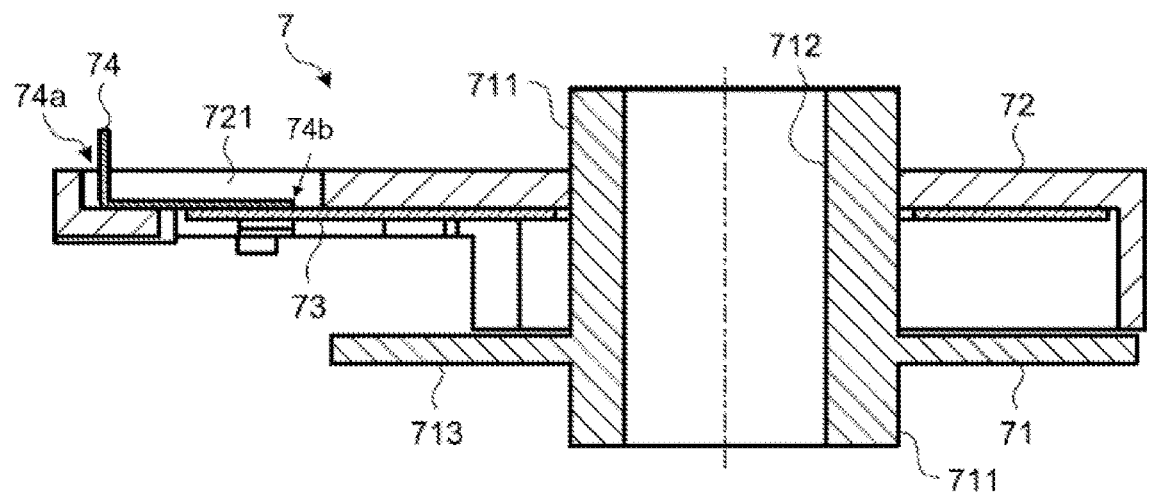
FIG. 7A is a sectional view taken along line C-C in FIG. 6.
Figure 7B:
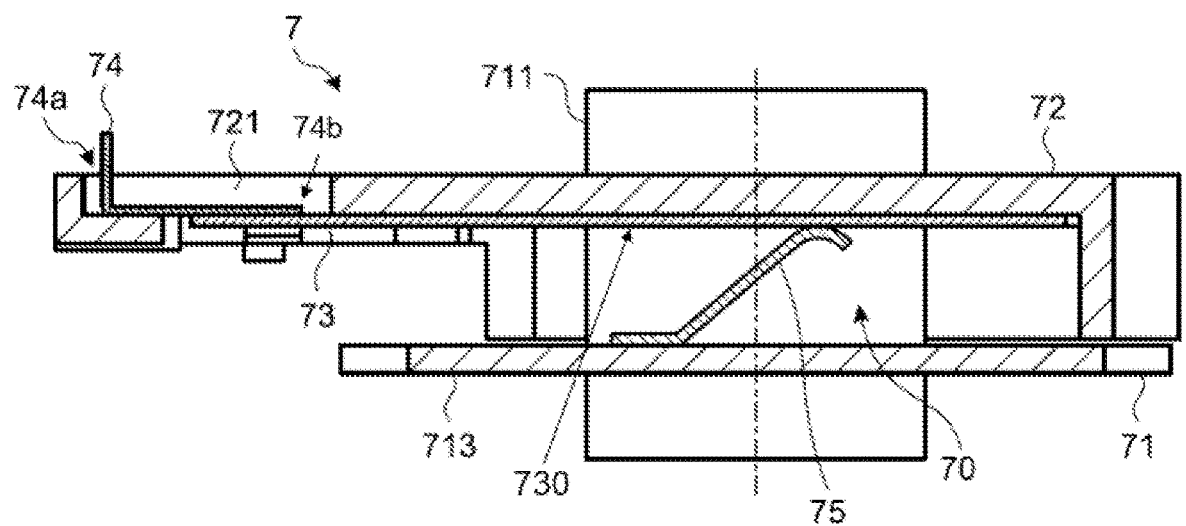
FIG. 7B is a sectional view taken along line D-D in FIG. 6.
Figure 8A:
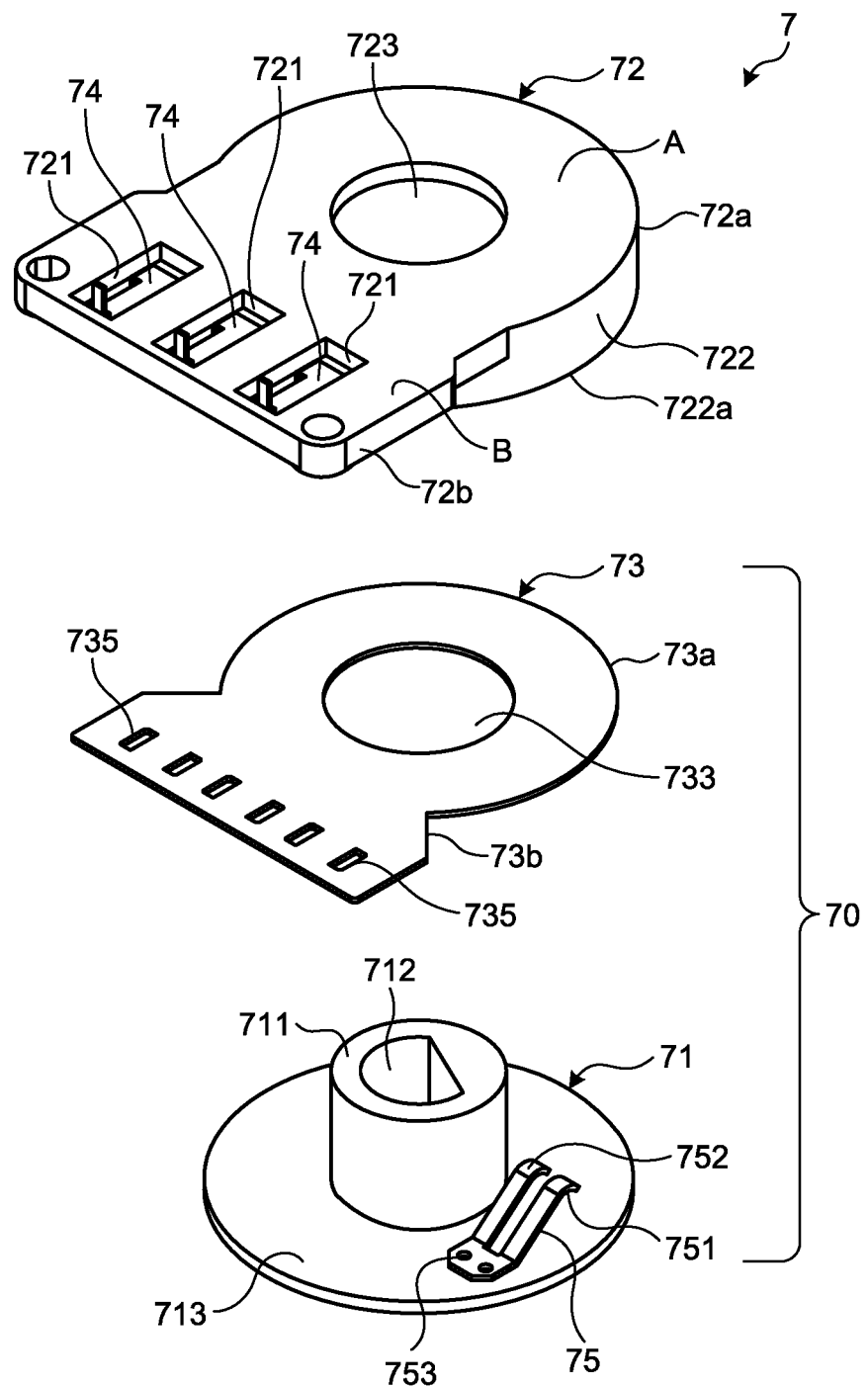
FIG. 8A is an exploded perspective view as viewed from a main surface side of the sensor housing.

The following specifically describes the sensor 7 with reference to the drawings. FIG. 6 is a plan view of the sensor housing 72. FIG. 7A is a sectional view taken along line C-C in FIG. 6, and FIG. 7B is a sectional view taken along line D-D in FIG. 6. FIG. 8A is an exploded perspective view as viewed from a main surface side of the sensor housing 72, and FIG. 8B is an exploded perspective view as viewed from a back surface side of a rotating body (a side opposite to a surface side where the wiring board 8 described later is provided) in the sensor housing 72.

The sensor 7 includes the sensor part 70 including a sensor board 73 and the brush 75, and the sensor housing 72 accommodating the sensor part 70. The sensor 7 can be used to detect the rotational angle of the output gear 5.

Figure 8B:
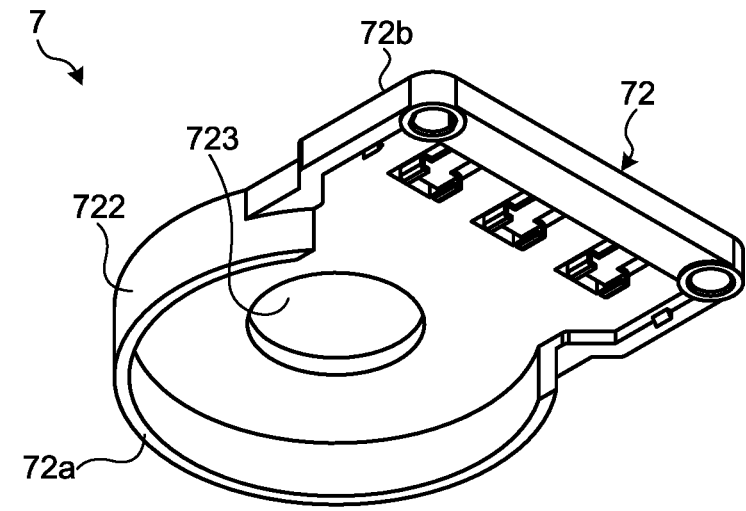
FIG. 8B is an exploded perspective view as viewed from a back surface side of a rotating body of the sensor housing.
Figure 8B:
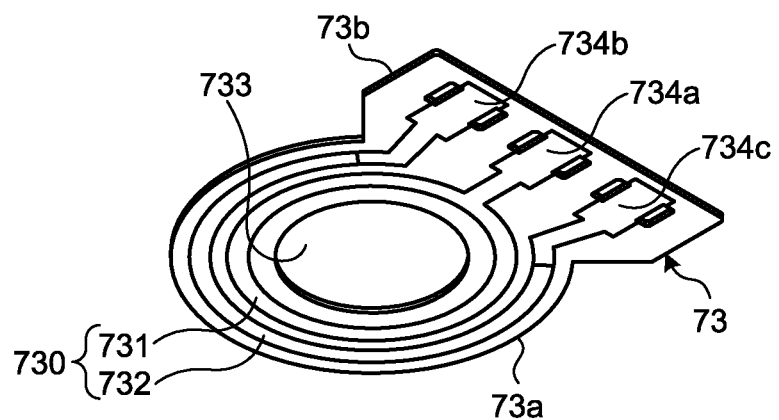
Figure 8B:
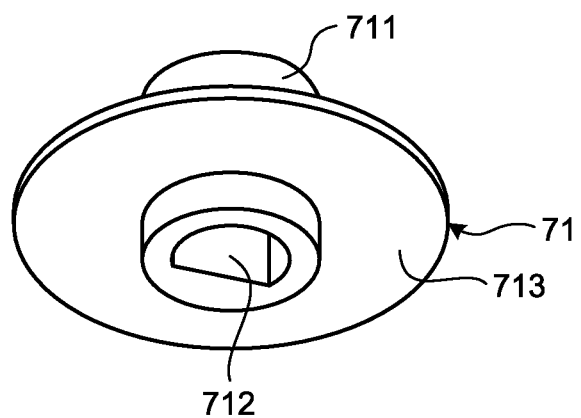

As illustrated in FIGS. 6, and 8A and 8B, the sensor housing 72 includes a first region A including an arc-like planar shape and a second region B including a rectangular planar shape. The first region A is surrounded by a first side portion 72a curved in a circumferential direction. The first side portion 72a is formed of a wall 722. The second region B is surrounded by a second side portion 72b. The second side portion 72b is formed of the wall 722. In other words, the first side portion 72a and the second side portion 72b are integrally formed together. A part of the first side portion 72a serves as the part of the sensor housing 72 accommodated in the recess 50 of the output gear 5. The part of the sensor housing 72 is a portion 72aa of the first side portion 72a projecting with respect to the second side portion 72b in the rotational axis direction of the output gear 5.

As illustrated in FIGS. 6, and 8A and 8B, a first hole (hereinafter, called a first circular hole) 723 including a circular shape is formed in a central position of the first side portion 72a of the sensor housing 72. A boss 711 can be inserted in the first circular hole 723. The boss 711 is provided at a center of the rotating plate 71 serving as a plate that rotates with the output gear 5. A hole (hereinafter, called a fitting hole) 712 is formed in the boss 711. The end portion of the output shaft 51 including the D-shaped sectional shape is fitted in the fitting hole 712.

A plurality of (in this case, three) holes (hereinafter, called rectangular holes) 721 each including a rectangular shape are formed in the second side portion 72b of the sensor housing 72. The hole 721 allows the end portion (distal end portion) of the first connection terminal 74 to project.

As illustrated in FIGS. 7B, 8A, and 8B, the sensor part 70 includes the electrically conductive brush 75 serving as a contacting part and the board (hereinafter, called the sensor board) 73. The board 73 is provided with a conductive portion 730 (FIG. 8B) serving as a contacted part contacted by the brush 75. The conductive portion 730 is electrically connected to an external device.

The sensor board 73 is made of, for example, an epoxy resin including a thickness of approximately 300 μm to approximately 1600 μm, and includes an annularly formed portion (hereinafter, called a circular portion) 73a and a rectangularly formed portion (rectangular portion) 73b. The sensor board 73 is provided to be harder than the flexible wiring board 8 (to be described later). The circular portion 73a is disposed in a region surrounded by the first side portion 72a of the sensor housing 72. The rectangular portion 73b is disposed in a region surrounded by the second side portion 72b of the sensor housing 72. Holes 735 are formed in the rectangular portion 73b, and the distal end portions of the first connection terminals 74 are inserted in the holes 735. The holes 735 each include a rectangularly formed planar shape.

As illustrated in FIGS. 8A and 8B, the sensor board 73 includes a second hole (hereinafter, called a second circular hole) 733 and the conductive portion 730. The boss 711 of the rotating plate 71 fitted in the output shaft 51 of the output gear 5 is inserted to the second circular hole 733. The conductive portion 730 is provided at a circumference of the second circular hole 733 using a known method, such as printing.

The conductive portion 730 includes an output part 731 that is provided on the second circular hole 733 side and is formed of an electrically conductive material including a low resistance, and a resistor part 732 that is provided outside the output part 731 and is formed of an electrically conductive material including a high resistance.

As illustrated in FIG. 8A, the brush 75 includes one end portion including two contacts 751 and 752, and includes another end portion including an end portion 753 extending from the two contacts 751 and 752. The end portion 753 is fixed to and held by a surface 713 of the rotating plate 71. The surface 713 faces the sensor board 73 such that the two contacts 751 and 752 contact the sensor board 73.

The output part 731 includes an annular portion and a led-out portion 734a led out of the annular portion. The annular portion is formed along the circumference of the second circular hole 733 so as to surround the second circular hole 733. The annular portion contacts the contact 752 as one of the two contacts 751 and 752 of the electrically conductive brush 75 illustrated in FIG. 8A.

The resistor part 732 includes an arc-like portion, a first led-out portion 734b led out of one end portion of the arc-like portion, and a second led-out portion 734c led out of the other end portion of the arc-like portion. The arc-like portion is formed in an arc shape along an outer circumference of the annular portion of the output part 731. The arc-like portion contacts the other contact 751 of the brush 75 illustrated in FIG. 8A The conductive portion 730 with the above-described configuration constitutes a variable resistor part. In other words, when contact positions of contact of the contacts 751 and 752 of the brush 75 change along the annular portion and the arc-like portion (in the circumferential direction), the resistance value of a path from the first led-out portion 734b to the led-out portion 734a changes. Thus, in a state where a voltage is applied between the first led-out portion 734b and the second led-out portion 734c, when the contact positions of the brush 75 are displaced along the annular portion and the arc-like portion (in the circumferential direction), a voltage between the first led-out portion 734b and the led-out portion 734a changes. Accordingly, the rotational angle of the output gear 5 can be detected based on the change in the voltage.

Since the sensor part 70 in the present embodiment includes the above-described configuration, the brush 75 is disposed in a part of the sensor housing 72 in the rotational axis direction of the output gear 5. In addition, the brush 75 is disposed on the output gear 5 side with respect to the sensor board 73. In other words, the rotating plate 71, the brush 75, and the sensor board 73 are arranged in this order from a bottom 53 side of the recess 50 with respect to the recess 50 provided in the output gear 5.

Accordingly, in the rotating device 1 according to the present embodiment, the sensor 7 can be very easily assembled. In other words, for example, it is only necessary to mount the sensor board 73 on a back surface side of the sensor housing 72 in advance, and put the sensor housing 72 from above the rotating plate 71 prepared so as to cover the rotating plate 71 such that the contacts 751 and 752 of the brush 75 fixed to the rotating plate 71 contact the conductive portion 730 of the sensor board 73.

Since the sensor part 70 including the sensor board 73 and the brush 75 can be covered with the sensor housing 72 to be protected, the sensor 7 can be easily handled.

In the present embodiment, the case has been exemplified where the sensor board 73 and the electrically conductive brush 75 construct a rotary resistive position sensor and the contact positions of the brush 75 with the conductive portion 730 are displaced in the circumferential direction to change the resistance value. However, the configuration of the conductive portion 730 need not be limited to the configuration of the present embodiment.

The configuration may be, for example, as follows: the arc-like portion is provided with notches formed at constant intervals from the outer circumferential side (or from the inner circumferential side), and no current flows (hereinafter, also referred to as "off operation") when the contacts 751 and 752 of the brush 75 are located at one of the notches, whereas a current flows (hereinafter, also referred to as "on operation") when the contacts 751 and 752 of the brush 75 are located in positions where no notch is present, and thus, the rotational angle of the output gear 5 is detected based on the number of the detected on-off operations.

(First Connection Terminal 74 and Second Connection Terminal 40)

The first connection terminal 74 and the second connection terminal 40 are connection terminals to be connected to an external connector for connecting to the rotating device 1.

The first connection terminal 74 includes one end portion 74b electrically connected to the sensor board 73 and an other end portion 74a to be electrically connected to an external device. The one end portion 74b is connected to the led-out portion 734a, the first led-out portion 734b, or the second led-out portion 734c of the sensor board 73.

The other end portion 74a of the first connection terminal 74 is bent to be formed into a bent portion, as illustrated in FIGS. 7A and 7B. A distal end portion of the bent portion extends toward a direction away from the bottom 53 of the recess 50 provided in the output gear 5, as illustrated in FIG. 5A.

The second connection terminal 40 is electrically connected to the first connection terminal 74. The second connection terminal 40 is provided in the casing 2. In other words, as illustrated in FIG. 3, the second connection terminal 40 is held by each of the holding portions 201 formed in the connector portion 200 of the casing 2 (refer to FIG. 1). The second connection terminal 40 includes a projecting portion 40b extending in the opposite direction to the direction of projection of the piece 40a. The projecting portion 40b is inserted in the holding portion 201, so that the second connection terminal 40 is held by the casing 2. In the present embodiment, a metal plate material is punched into a predetermined shape to be formed into the first connection terminal 74.

The second end portion of the first connection terminal 74 is electrically connected to the piece 40a provided at the first end portion of the second connection terminal 40 via the flexible wiring board 8. The piece 40a is provided at the first end portion of the second connection terminal 40, and projects in the direction away from the bottom 53 of the recess 50 provided in the output gear 5.

As described above, since the first connection terminal 74 is provided with the bent portion 74a bent upward and the second connection terminal 40 is provided with the piece 40a, the connection can be stably made through the flexible wiring board 8 (refer to FIGS. 2 and 3) to be described later.

(Wiring Board 8)

The wiring board 8 is formed of a flexible film, and as illustrated in FIG. 3, includes broadly three planar portions 81, 82, and 83. Specifically, the wiring board 8 includes the first planar portion 81 on one end portion side of the wiring board 8 connected to the first connection terminals 74 and the second connection terminals 40, the second planar portion 82 on the other end portion side of the wiring board 8 connected to the terminals 33 of the motor 3, and the third planar portion 83 connecting the first planar portion 81 to the second planar portion 82.

The first planar portion 81 is provided with holes each engaging with the first end portion of the first connection terminal 74 (hereinafter, called an end portion on the bent portion 74a side) and holes each engaging with the piece 40a of the second connection terminal 40. The end portions on the bent portion 74a side of the first connection terminals 74 and the pieces 40a of the second connection terminals 40 engage with the holes, and are soldered. Thus, reliable electrical connection can be carried out. Accordingly, a contact failure can be restrained.

The flexible wiring board 8 includes a structure including an adhesive layer and a conductor. The adhesive layer is provided on a film (resin substrate) including a thickness of, for example, approximately 12 µm to 50 µm. The conductor includes a thickness of, for example, approximately 12 µm to approximately 50 µm and is printed or pasted onto the adhesive layer. The film is formed of an insulating resin material, such as polyimide or polyester, for example. The conductor is formed of a metal material, such as copper, for example. The adhesive layer is formed of an epoxy resin or an acrylic resin, for example. The wiring board 8 described above is a flexible board that can restore a form before being bent even when being bent at an angle of 90 degrees or larger.

As described above, the first connection terminals 74 are connected to the second connection terminals 40 by the flexible wiring board 8. Thus, for example, when the first connection terminals 74 and the second connection terminals 40 vibrate by vibration of the vehicle such as the automobile, the flexible wiring board 8 changes in shape (or absorbs the vibration) to attenuate amplitude of the vibration before strong stresses are applied to the joint portions electrically connected by, for example, the soldering, and the strong stresses can be avoided from being applied to the joint portions. Accordingly, the joint portions can be avoided from being cracked or damaged.

As described above, since the first connection terminals 74 and the second connection terminals 40 are electrically connected using the flexible wiring board 8, this configuration provides easier handling and is more advantageous in manufacturing cost than in a case of, for example, using thin and easily breakable lead wires.

In the present embodiment, as illustrated in FIG. 3, the second planar portion 82 of the wiring board 8 to be connected to the terminals 33 of the motor 3 is also provided with holes for engaging with the terminals 33. Accordingly, the reliable electrical connection can be carried out by engaging the holes with the terminals 33 of the motor 3 and soldering the engaged portions.

(Characteristic Configuration of Casing 2)

Figure 9:
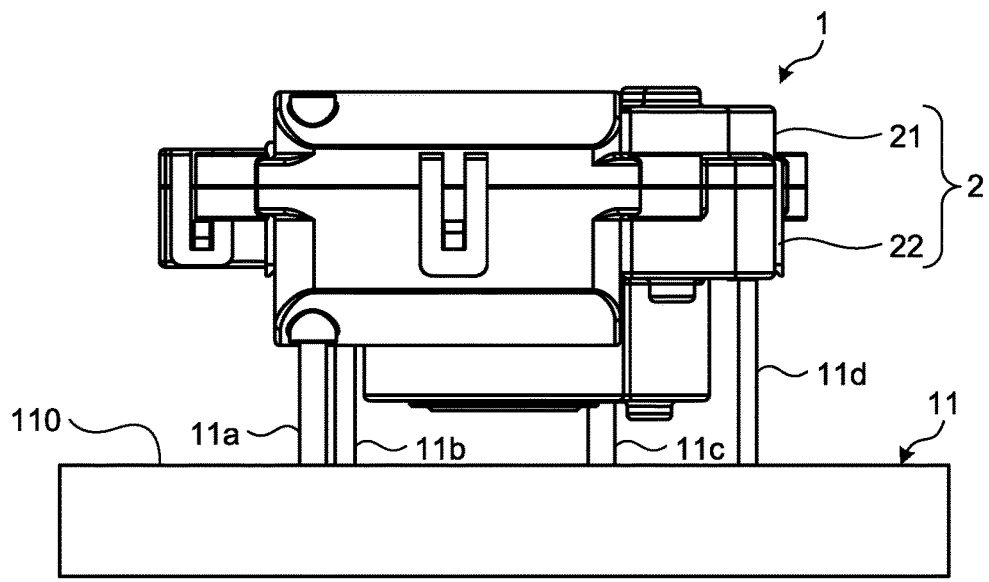
FIG. 9 is a front view of the rotating device set on a jig.
Figure 10:
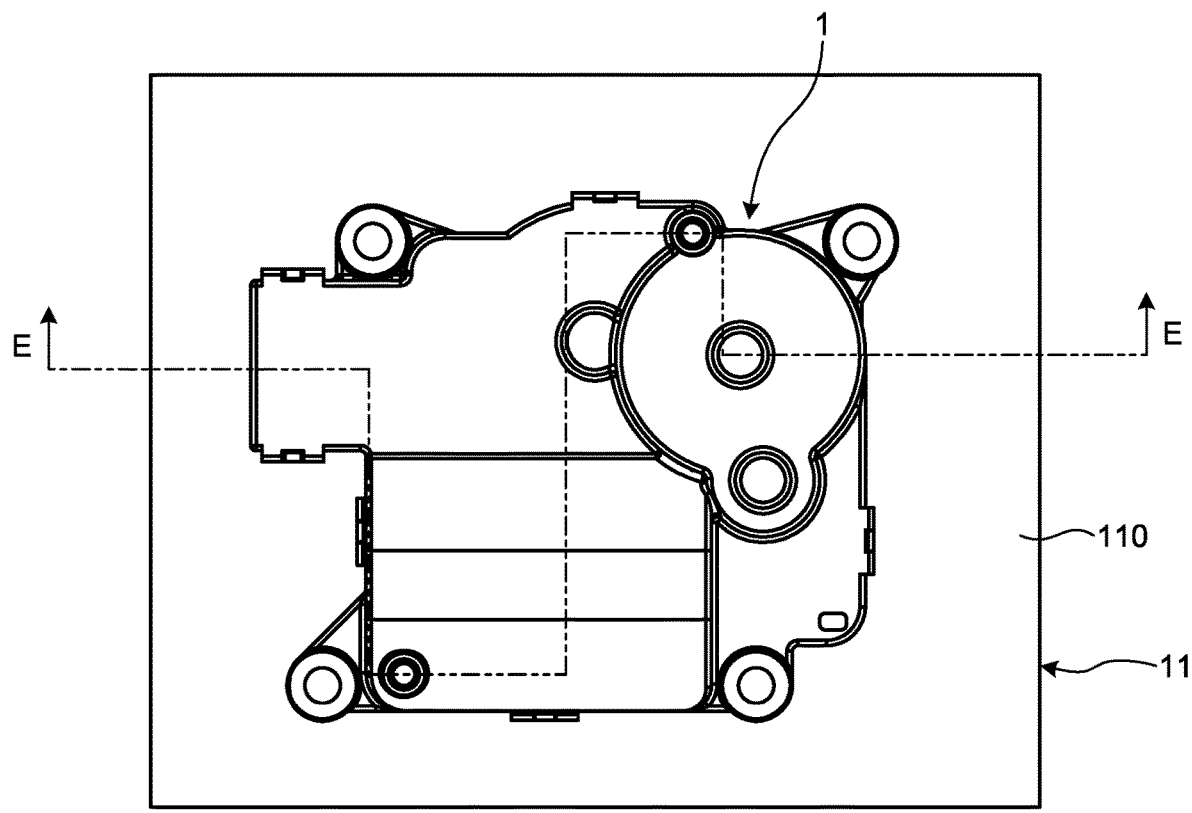
FIG. 10 is a plan view of the rotating device set on the jig.
Figure 11A:
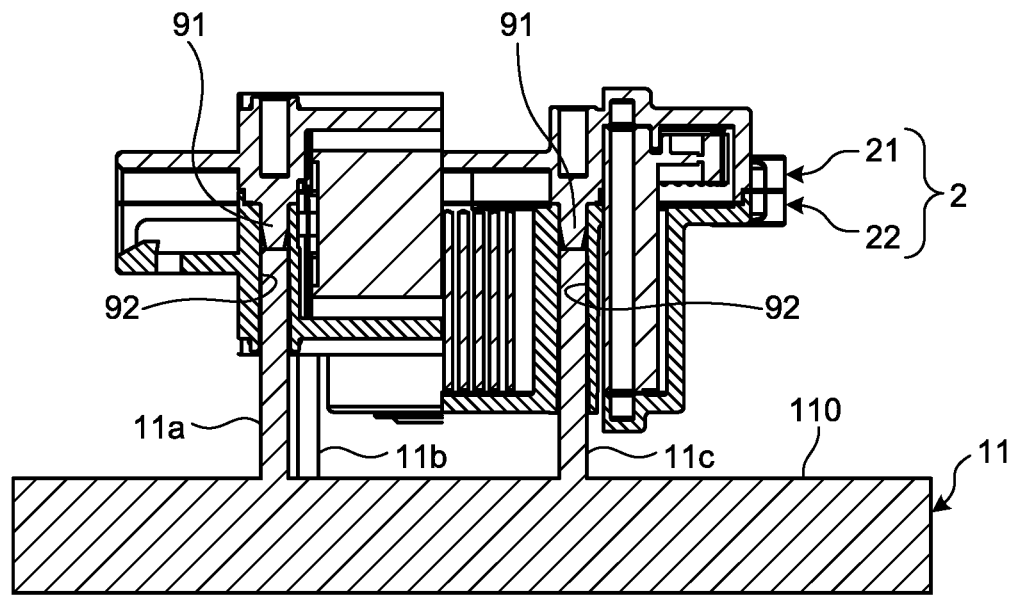
FIG. 11A is a sectional view taken along line E-E in FIG. 10.
Figure 11B:
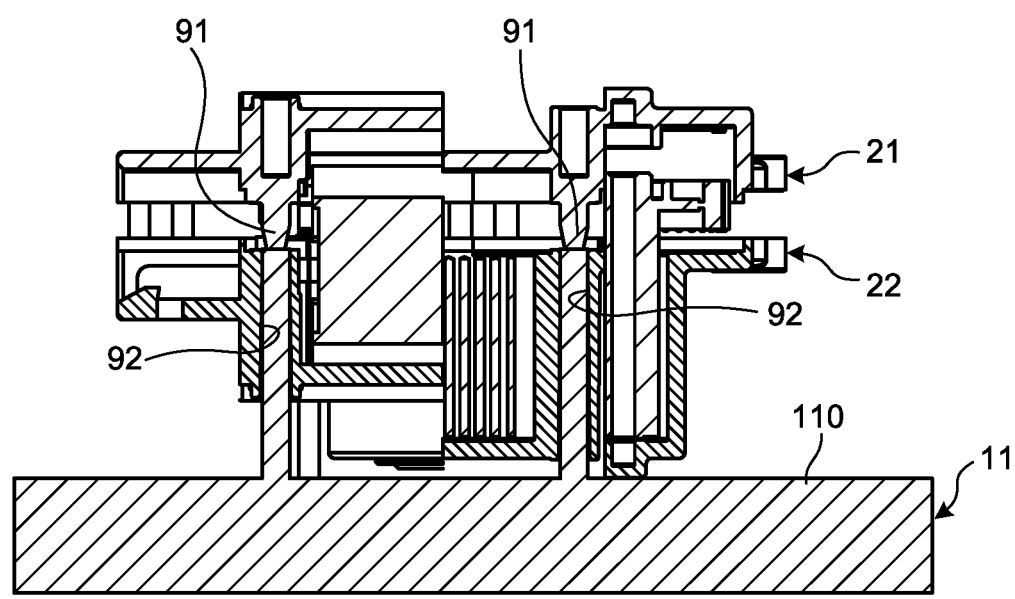
FIG. 11B is an explanatory view illustrating a state where the first casing and a second casing of the rotating device set on the jig are separated, and corresponding to the sectional view of FIG. 11A.

The following describes a configuration of the casing 2 of the rotating device 1 according to the present embodiment, in particular, a characteristic configuration of the casing 2 in the present embodiment. FIG. 9 is a front view of the rotating device 1 set on a jig, and FIG. 10 is a plan view of the rotating device 1 set on the jig. FIG. 11A is a sectional view taken along line E-E in FIG. 10, and FIG. 11B is an explanatory view illustrating a state where the first casing 21 and the second casing 22 of the rotating device 1 set on the jig are separated, and corresponding to the sectional view of FIG. 11A.

As described above, the casing 2 according to the present embodiment includes the first casing 21 and the second casing 22 facing each other. The casing 2 accommodates the motor 3, and the gears for transmitting the rotation of the motor 3 to an external device, and the output gear 5. The gears include the worm gear 4, the transmission gears 6 including the first transmission gear 61 and the second transmission gear 62.

In conventional rotating devices including a configuration similar to the configuration of the casing 2, neither stiffness nor repeatability of assembly and disassembly of the casing 2 including the first casing 21 and the second casing 22 is taken into account.

Accordingly, in the rotating device 1 according to the present embodiment, the first casing 21 is provided with the projections 91 extending in the rotational axis direction of the output gear 5, as illustrated in FIG. 3. The second casing 22 is provided with the plurality (four, in this case) of through-holes 92 corresponding to the respective projections 91, as illustrated in FIGS. 2 and 3. In the casing 2 configured by connecting the first casing 21 to the second casing 22, the plurality of projections 91 are fitted in the respective through-holes 92.

As described above, since the plurality of projections 91 and the plurality of through-holes 92 are provided and fitted with each other, the first casing 21 can be easily connected to and separated from the second casing 22. Accordingly, the functional part accommodated in the casing 2 can also be easily analyzed and maintained.

At least two or more sets of the plurality of projections 91 and the plurality of through-holes 92 corresponding to each other are preferably provided. This is specifically because, if two sets are provided, the two sets can be used as references for accurate positioning in X and Y directions when the first casing 21 is connected to the second casing 22. The X and Y directions are directions along the first surface portion 210 of the first casing and the second surface portion 220 of the second casing.

At least two of the projections 91 are each pressed into corresponding one of the through-holes 92. In the present embodiment, four sets of the projections 91 and the through-holes 92 are provided, and all of the each projection 91 is pressed into each of the through-holes 92.

Accordingly, the stiffness of the casing 2 can be increased as a whole, and abnormal noise can be restrained from occurring. Since sound generated in the rotating device 1 does not leak out from the through-holes 92, quietness is unlikely to be impaired.

Although only one of the projections 91 appears at the first casing 21 illustrated in FIG. 3, four of the projections 91 corresponding to the four through-holes 92 provided in the first casing 21 illustrated in FIGS. 2 and 3 are actually provided.

As is clear from FIGS. 11A and 11B, the dimension of the through-holes 92 is larger than the dimension of the projections 91 in a lengthwise direction of the projections 91.

The above-described configuration allows the first casing 21 to be easily separated from the second casing 22 using a jig 11. In other words, the first casing 21 can be very easily separated from the second casing 22 using the jig 11 including rod-like bodies 11a to 11d corresponding to the respective through-holes 92 provided in the second casing 22 and a support base 110 for supporting the rod-like bodies 11a to 11d, as illustrated in FIG. 9.

A casing separation method for separating the casing 2 into the first casing 21 and the second casing 22 includes a step of setting the above-mentioned jig 11, as illustrated in FIG. 9, and a step of inserting the plurality (four, in this case) of rod-like bodies 11a to 11d into the plurality (four, in this case) of through-holes 92 formed in the second casing 22. The casing separation method further includes a step of pressing the second casing 22 in a direction toward the support base 110 of the jig 11.

In other words, starting from a state illustrated in FIG. 11A, pressing the second casing 22 in the direction toward the support base 110 of the jig 11 can cause each of the rod-like bodies 11a to 11d to function as a guide to smoothly push down the second casing 22 in the vertical direction. As a result, as illustrated in FIG. 11B, the projections 91 having been pressed into the through-holes 92 are easily separated from the projections 91, and the casing 2 is easily separated into the first casing 21 and the second casing 22.

The first casing 21 and the second casing 22 separated using the above-described method are not subjected to, for example, a deformation. Accordingly, the first casing 21 can be easily combined again with the second casing 22 after, for example, the inside of the casing 2 has been analyzed and/or maintained.

The first embodiment described above provides the rotating device 1 described below.

(1) The rotating device 1 includes the motor 3, a gear (the output gear 5 and the transmission gears 6) for transmitting the rotation of the motor 3 to an external device, and the sensor 7, the sensor 7 including the sensor part 70 and the sensor housing 72 that accommodates the sensor part 70; the rotational angle of the gear is detectable by the sensor 7; the gear includes the recess 50 in the rotational axis direction; and a part of the sensor housing 72 is accommodated in the recess 50.

With the above-described rotating device 1, the part of the sensor housing 72 is accommodated in the gear, so that the rotating device 1 can be reduced in thickness.

(2) In the rotating device 1 described in (1) above, the sensor part 70 includes the electrically conductive brush 75 and the sensor board 73 provided with the conductive portion 730 to be electrically connected to an external device, and the brush 75 is accommodated in the part of the sensor housing 72, the sensor housing 72 being accommodated in the recess 50 of the gear.

With the above-described rotating device 1, the part of the sensor housing 72 accommodating the brush 75 can be accommodated in the recess 50 of the gear while protecting the brush 75 and the sensor board 73 with the sensor housing 72, the sensor housing 72 providing a thickness in the height direction of the sensor 7. Therefore, this configuration can greatly contribute to the reduction of the thickness of the rotating device 1.

(3) The rotating device 1 described in (2) above includes the casing 2 that accommodates the motor 3, the gear (the output gear 5 and the transmission gears 6), and the sensor housing 72. The brush 75 is located in the part of the sensor housing 72 in the rotational axis direction of the gear. The brush 75 is disposed closer to the gear than to the sensor board 73.

With the above-described rotating device 1, the sensor 7 can be very easily assembled, and in turn, the rotating device 1 is also improved in assemblability.

(4) In the rotating device 1 described in (3) above, the casing 2 includes the first surface portion 210 serving as the bottom of the casing 2 facing the gear (the output gear 5 or the transmission gears 6) and the second surface portion 220 serving as the top surface of the casing 2 facing the sensor housing 72, the surface portions being arranged in the rotational axis direction of the gear; the sensor part 70 includes the rotating plate 71 that holds one end portion of the brush 75 and rotates integrally with the gear; and the rotating plate 71, the brush 75, and the sensor board 73 are arranged in this order from the bottom side of the recess 50 of the gear.

With the above-described rotating device 1, the assemblability of the sensor 7 and the assemblability of the rotating device 1 can be further improved.

(5) In the rotating device 1 described in (3) or (4) above, the sensor part 70 includes the first connection terminals 74 each including the first end portion electrically connected to the sensor board 73 and the second end portion to be electrically connected to an external device, and the second end portion of each of the first connection terminals 74 extends toward the direction away from the bottom of the recess 50 of the gear (the output gear 5 or the transmission gears 6).

With the above-described rotating device 1, the first connection terminal 74 can be easily electrically connected to an external device using, for example, the connecting member.

(6) In the rotating device 1 described in (5) above, the casing 2 is provided with the second connection terminals 40 each electrically connected to the first connection terminal 74, and the second end portion of each of the first connection terminals 74 is electrically connected to the first end portion of the second connection terminal 40 through the wiring board 8.

With the above-described rotating device 1, the end portions of the first connection terminals 74 and the second connection terminals 40 can be easily electrically connected to each other by mounting the wiring board 8 from above to the first connection terminals 74 and the second connection terminals 40 arranged in advance, so that the assemblability of the rotating device 1 can be improved.

(7) In the rotating device 1 described in (6) above, the wiring board 8 is formed of the flexible film.

With the above-described rotating device 1, even when, for example, vibration is applied, the flexible wiring board 8 can absorb the vibration, and even if the first connection terminals 74 are electrically connected to the second connection terminals 40 by, for example, the soldering, the strong stresses can be avoided from being applied to the joint portions between the first connection terminals 74 and the second connection terminals 40, so that the joint portions can be avoided from being cracked or damaged to be disconnected.

(8) In the rotating device 1 described in any one of (1) to (7) above, the gear provided with the recess 50 is the output gear 5; the rotating device 1 includes the transmission gear 6 that transmits the rotation of the motor 3 to the output gear 5; the transmission gear 6 is the multi-stage gear including a large diameter portion (for example, the second large diameter portion 622) and a small diameter portion (for example, the second small diameter portion 621), the rotation being transmitted from the motor 3 to the large diameter portion, the small diameter portion extending from the second large diameter portion 622 and transmitting the rotation to the output gear 5; the second large diameter portion 622 is disposed so as to partially overlap the output gear 5 in the rotational axis direction; and the sensor housing 72 is disposed between the second large diameter portion 622 and the output gear 5.

With the above-described rotating device 1, the rotating device 1 can be reduced in thickness and size while reducing the speed of the rotation transmitted from the motor 3 at an appropriate reduction ratio.

According to the first embodiment described above, the rotating device 1 and the method for separating the casing 2 in the rotating device 1 described below are further provided.

(9) The rotating device 1 includes the casing 2 including the first casing 21 and the second casing 22 facing each other, and includes the motor 3 that are accommodated in the casing 2, and includes the gear (the transmission gear 6 and the output gear 5) for transmitting the rotation of the motor 3 to an external device, the first casing 21 being provided with the plurality of projections 91; the second casing 22 is provided with the plurality of through-holes 92 corresponding to the respective projections 91; and the plurality of projections 91 are fitted in the plurality of through-holes 92.

With the above-described rotating device 1, the casing 2 for accommodating the motor 3, the transmission gear 6 and the output gear 5, and the sensor 7 can be very easily assembled and separated.

(10) In the rotating device 1 described in (9) above, at least two or more sets of the plurality of projections 91 and the plurality of through-holes 92 corresponding to each other are provided.

With the above-described rotating device 1, the projections 91 and the through-holes 92 can be used as references for accurate positioning in the X and Y directions.

(11) In the rotating device 1 described in (9) or (10) above, two of the projections 91 are each pressed into corresponding one of the through-holes 92.

With the above-described rotating device 1, the stiffness of the casing 2 can be increased and abnormal noise can be restrained from occurring while providing the accurate positioning. Since sound generated in the rotating device 1 does not leak out from the through-holes 92, quietness is unlikely to be impaired.

(12) In the rotating device 1 described in any one of (9) to (11) above, the dimension of the through-holes 92 is larger than the dimension of the projections 91 in the lengthwise direction of the projections 91.

With the above-described rotating device 1, for example, the first casing 21 can be easily separated from the second casing 22, using the jig 11.

(13) The casing separation method for separating the casing 2 in the rotating device 1 described in any one of (9) to (12) above into the first casing 21 and the second casing 22, the casing separation method includes the step of setting the jig 11 including the rod-like bodies 11a to 11d corresponding to the respective through-holes 92 and the support base 110 provided with the rod-like bodies 11a to 11d, the step of inserting the plurality of rod-like bodies 11a to 11d into the plurality of through-holes 92 formed in the second casing 22, and the step of pressing the second casing 22 in the direction toward the support base 110 of the jig 11.

Second Embodiment

The following describes the rotating device 1 according to a second embodiment of the present invention with reference to drawings. The rotating device 1 according to the second embodiment is the same in basic structure as the rotating device 1 according to the first embodiment described above, and the same components are denoted by the same reference signs without specific description.

Figure 12:
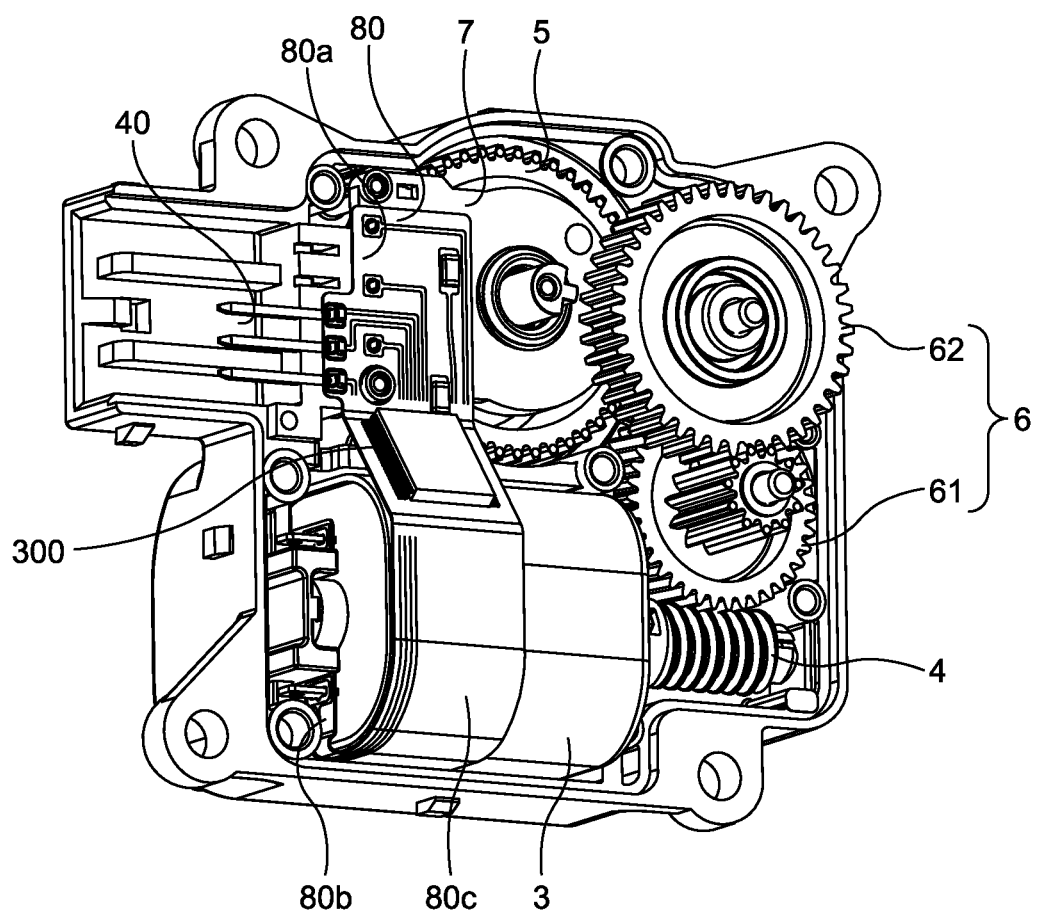
FIG. 12 is a perspective view of the rotating device according to a second embodiment of the present invention with the first casing removed from the rotating device.
Figure 13:
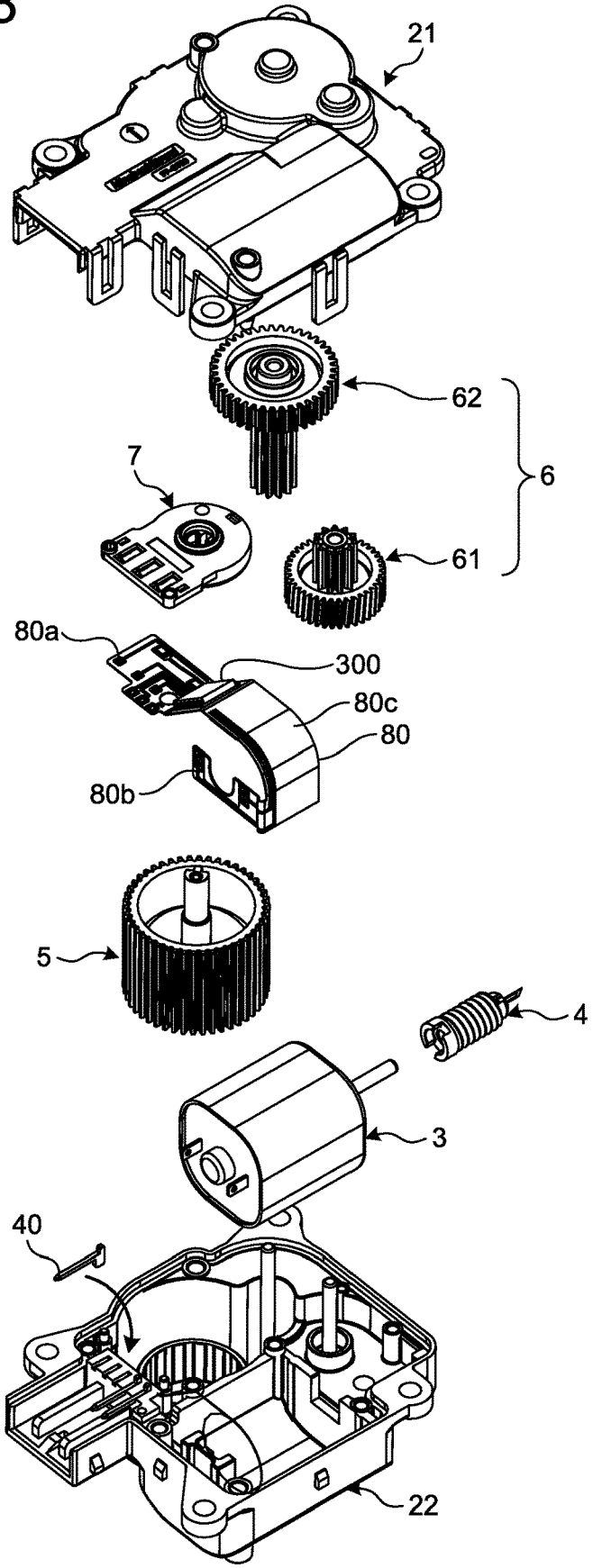
FIG. 13 is an exploded perspective view of the rotating device according to the second embodiment.

FIG. 12 is a perspective view of the rotating device 1 according to the second embodiment with the first casing 21 removed from the rotating device, and FIG. 13 is an exploded perspective view of the rotating device 1 according to the second embodiment.

As illustrated in FIG. 12, the rotating device 1 according to the second embodiment also includes the motor 3, the transmission gears 6 and the output gear 5 for transmitting the rotation of the motor 3 to an external device, the sensor 7, the first connection terminals 74 and the second connection terminals 40 to be electrically connected to an external device, and a wiring board 80 for electrically connecting together the motor 3, the sensor 7, and the first connection terminals 74 and the second connection terminals 40. The wiring board 80 is formed of a flexible film.

The rotational angle of the output gear 5 is detectable by the sensor 7, and an integrated circuit (IC) 300 serving as an electronic component for controlling the operation of the motor 3 is mounted on the wiring board 80.

As described above, the rotating device 1 according to the second embodiment differs from the rotating device 1 according to the first embodiment in that the IC 300 for controlling the operation of the motor 3 is mounted on the flexible wiring board 80.

In other words, in conventional rotating devices (refer, for example, to Japanese Patent Application Laid-open No. 2009-261130), an electronic component for controlling the operation of a motor is mounted on a board. Therefore, the position for disposing the electronic component is limited, so that, depending on the position where the electronic component is disposed, the position may cause an increase in size of the rotating device.

Therefore, in the rotating device 1 according to the present embodiment, the integrated circuit (IC) 300 serving as the electronic component is mounted at the flexible wiring board 80.

As illustrated in FIGS. 12 and 13, the IC 300 is mounted at the wiring board 80 in a region located between the first connection terminals 74 and the second connection terminals 40, and the motor 3 that are electrically connected together. In other words, the IC 300 is mounted at a part of the wiring board 80 located between the first connection terminals 74 and the second connection terminals 40, and the motor 3.

Specifically, as illustrated in FIGS. 12 and 13, the wiring board 80 includes a configuration including broadly three planar portions 80a, 80b, and 80c. While the planar portions 80a, 80b, and 80c correspond to the first planar portion 81, the second planar portion 82, and the third planar portion 83 of the wiring board 8 presented in the first embodiment, the first planar portion 80a and the third planar portion 80c include substantially the same width in the present embodiment.

In other words, the third planar portion 83 in the first embodiment plays a role of connecting the first planar portion 81 to the second planar portion 82. In the present embodiment, however, the third planar portion 80c is formed to be continuous to the first planar portion 80a with substantially the same width, and the IC 300 is mounted on a surface of the third planar portion 80c including the sufficient width.

As described above, using the wiring board 80 formed of the film increases the flexibility of arrangement of the IC 300. The increase in flexibility can reduce the size or thickness of the rotating device 1 by effectively using a vacant space by, for example, disposing the IC 300 using the dead space in the casing 2.

As described above, the rotating device 1 according to the second embodiment includes the casing 2 for accommodating the motor 3, the transmission gears 6 and the output gear 5, the sensor 7, the first connection terminals 74 and the second connection terminals 40, and the wiring board 80. The IC 300 is disposed in a position lower than the overall height of the motor 3 in the casing 2 in the rotational axis direction of the output gear 5. In other words, the third planar portion 80c is disposed in an inclined state along a corner of an outer shell of the motor 3 so as to dispose the IC 300 in the position lower than the overall height of the motor 3. The corner of the motor 3 with the third planar portion 80c disposed at the corner of the motor 3 faces upward (toward the first casing 21) and is curved.

The overall height of the motor 3 in the rotational axis direction of the output gear 5 refers to a part of the motor 3 located in the highest position (for example, a part of a side face located in the highest position among the side faces of the outer shell (frame) facing the first surface portion 210 serving as the top surface of the first casing 21) with respect to the surface portion 220 of the casing 2 in contact with the motor 3, that is, the bottom of the second casing 22 (refer to FIGS. 1 and 3).

The IC 300 contacts the motor 3 via the wiring board 80. In addition, in the present embodiment, the third planar portion 80c serving as a part of the wiring board 80 is fixed to the outer shell of the motor 3. In this case, for example, double-sided tape is used to fix the third planar portion 80c of the wiring board 80 to the outer shell of the motor 3.

As described above, conventionally, to prevent an electronic component from being damaged by externally applied vibration, the electronic component needs to be mounted at a wiring board made of, for example, hard epoxy glass. In addition, a region for fixing the wiring board made of hard epoxy glass needs to be secured in a casing to firmly fix the wiring board to the casing.

In that case, however, the size of a rotating device increases. Accordingly, in the rotating device 1 according to the present embodiment, since the wiring board 8 is formed of the flexible film, the wiring board 8 can be easily fixed to the outer shell of the motor 3 even using, for example, the double-sided tape.

As described above, the rotating device 1 according to the present embodiment has the higher flexibility of arrangement of the electronic component, such as the IC 300 for controlling the operation of the motor 3, and accordingly, can be reduced in size or thickness while saving a space in the casing 2.

The second embodiment described above provides the rotating device 1 described below.

(14) The rotating device 1 includes the motor 3, the gear (the transmission gears 6 and the output gear 5) for transmitting the rotation of the motor 3 to an external device, the sensor 7, the connection terminals (the first connection terminals 74 and the second connection terminals 40) to be electrically connected to an external device, and the wiring board 80 for electrically connecting together the motor 3, the sensor 7, and the connection terminals (the first connection terminals 74 and the second connection terminals 40), the rotational angle of the output gear 5 being detectable by the sensor 7; the IC 300 serving as the electronic component for controlling the operation of the motor 3 is mounted on the wiring board 80; and the wiring board 80 is formed of the flexible film.

With the above-described rotating device 1, the flexibility of arrangement of the electronic component such as the IC 300 increases, so that the size or thickness can be reduced while saving a space in the casing 2.

(15) In the rotating device 1 described in (14) above, the IC 300 serving as the electronic component is mounted at the wiring board 80 in the region between the connection terminals (the first connection terminals 74 and the second connection terminals 40) and the motor 3.

With the above-described rotating device 1, the IC 300 can be disposed in a suitable space in the casing 2, and the casing 2 can be more reliably reduced in thickness or size.

(16) The rotating device 1 described in (14) or (15) above includes the casing 2 that accommodates the motor 3, the gear (the transmission gears 6 and the output gear 5), the sensor 7, the connection terminals (the first connection terminals 74 and the second connection terminals 40), and the wiring board 80, the IC 300 being disposed in the position lower than the overall height of the motor 3 in the casing 2 in the rotational axis direction of the output gear 5.

With the above-described rotating device 1, the casing 2 can be more reliably reduced in thickness or size.

(17) In the rotating device 1 described in any one of (14) to (16) above, the electronic component such as the IC 300 contacts the motor 3 via the wiring board 80.

With the above-described rotating device 1, the electronic component such as the IC 300 can be disposed in a stable state in the casing 2 while increasing the flexibility of arrangement of the electronic component such as the IC 300.

(18) In the rotating device 1 described in any one of (14) to (17) above, a part of the wiring board 80 is fixed to the outer shell of the motor 3.

With the above-described rotating device 1, the electronic component such as the IC 300 can be easily fixed into the casing 2 while increasing the flexibility of arrangement of the electronic component such as the IC 300.

Third Embodiment

The following describes the rotating device 1 according to a third embodiment of the present invention with reference to the drawings. The rotating device 1 according to the third embodiment is the same in basic structure as the rotating device 1 according to the first and the second embodiments described above, and the same components are denoted by the same reference signs without specific description.

Figure 14:
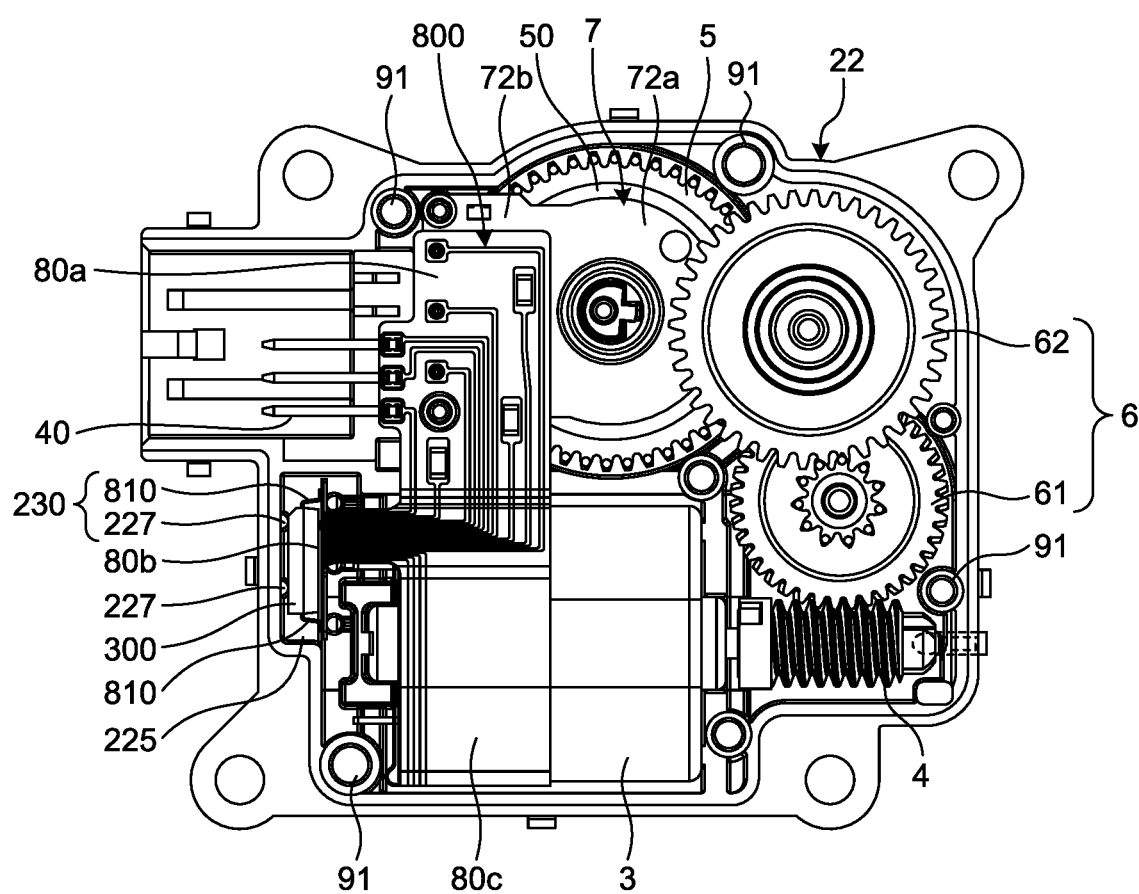
FIG. 14 is a plan view of the rotating device according to a third embodiment of the present invention with the first casing removed from the rotating device.
Figure 15:
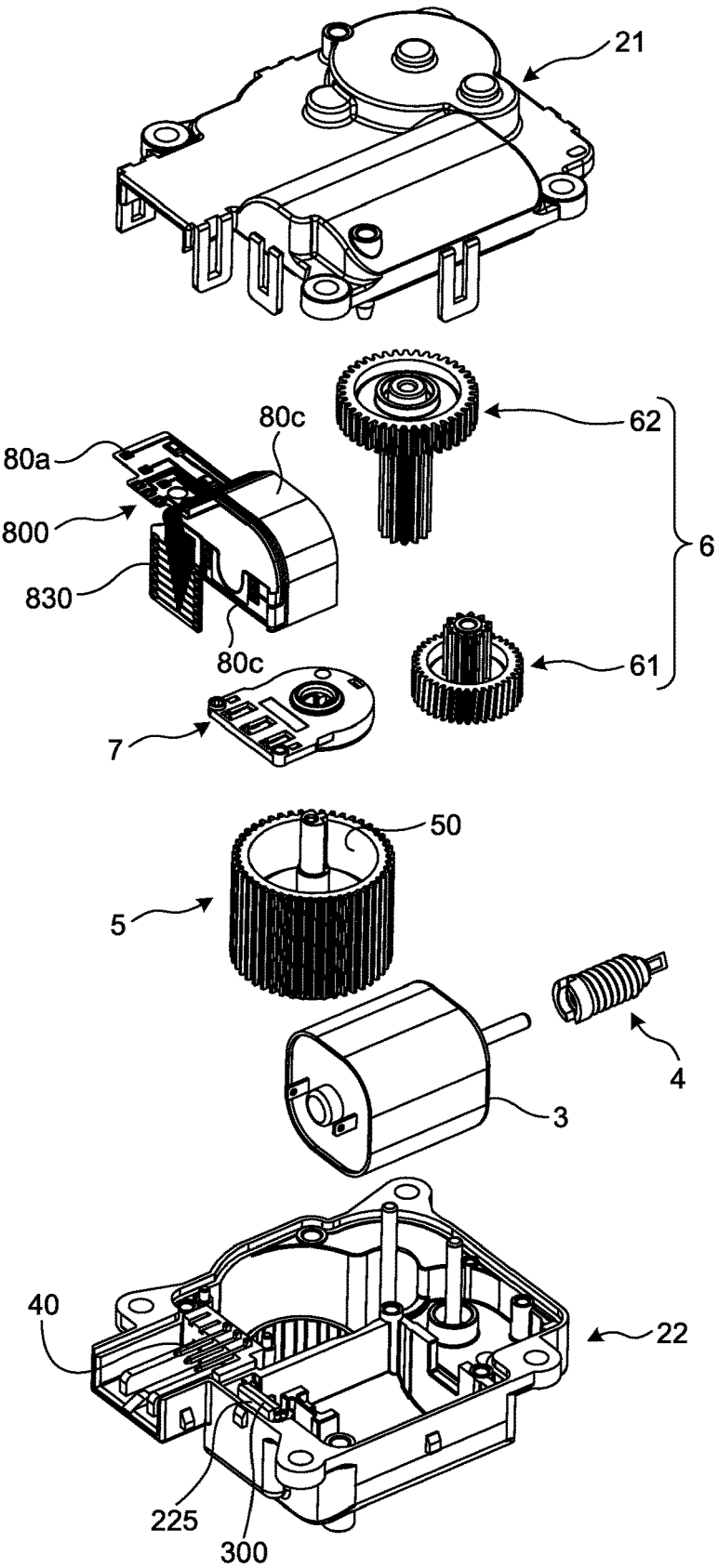
FIG. 15 is an exploded perspective view of the rotating device according to the third embodiment.

FIG. 14 is a plan view of the rotating device 1 according to the third embodiment with the first casing 21 removed from the rotating device 1. FIG. 15 is an exploded perspective view of the rotating device 1 according to the third embodiment.

As illustrated in FIGS. 14 and 15, the rotating device 1 according to the second embodiment also includes the casing 2, the motor 3, the transmission gears 6 and the output gear 5 for transmitting the rotation of the motor 3 to an external device, the sensor 7, and the first connection terminals 74 and the second connection terminals 40 to be electrically connected to an external device, and further includes the wiring board 80 for electrically connecting together the motor 3, the sensor 7, and the first connection terminals 74 and the second connection terminals 40. The rotational angle of the output gear 5 is detectable by the sensor 7.

In the same way as in the rotating device 1 according to the second embodiment, the IC 300 serving as the electronic component is mounted at the flexible wiring board 800 formed of a film except that the IC 300 is held by the casing 2. That is, in the rotating device 1 according to the third embodiment, the IC 300 is mounted at the wiring board 800, and additionally the IC 300 is held by the casing 2.

In other words, in, for example, the above-described conventional rotating devices (for example, Japanese Patent Application Laid-open No. 2009-261130), for example, the externally applied vibration may damage the IC 300 serving as the electronic component or separate the solder connected to the IC 300.

Accordingly, in the rotating device 1 according to the present embodiment, the IC 300 serving as the electronic component mounted at the flexible wiring board 800 formed of the film is further held by the casing 2.

Specifically, as illustrated in FIGS. 14 and 15, a space (hereinafter, called a holding space) 225 for holding the IC 300 is formed in the second casing 22 constituting the casing 2. The holding space 225 is provided with a plurality of holding portions 230 for holding the IC 300 serving as the electronic component.

In this way, since the casing 2 includes a configuration that holds the IC 300 mounted at the wiring board 800, the IC 300 can be restrained from being damaged. If vibration is applied, the flexible wiring board 800 absorbs the vibration, so that the solder or the like for connecting the wiring to the IC 300 can be restrained from separating from the IC 300. Accordingly, the IC 300 can keep the electrical connection to the wiring board 800.

The holding portions 230 include convex portions 227 projecting from an inner wall surface of the casing 2 (second casing 22), as illustrated. Distal end portions of the convex portions 227 are each preferably, for example, shaped to be rounded or provided with a flexible material so as not to damage the surface of the IC 300. The inner wall surface of the casing 2 is included in the holding portions 230 if being capable of holding the IC 300 in a pinching manner in cooperation with another member.

One or two or more holding portions of the plurality of holding portions 230 are a part of the casing 2 (second casing 22), and the IC 300 is elastically held in the casing 2 by the one or two or more holding portions.

In the present embodiment, a pair of members (hereinafter, called pinching members) 810, 810 capable of pinching the IC 300 from both sides of the IC 300 are each provided as one of the holding portions 230. The pinching member 810 is formed of an elastic member including more elasticity than members forming the other holding portion 230, such as the inner wall surface of the casing 2 and the convex portions 227 described above. In this case, the pinching members 810, 810 are formed of plate springs.

To locate the IC 300 in the holding space 225, in the wiring board 800 of the present embodiment, a part of the third planar portion 80c of the wiring board 80 used in the second embodiment is provided with a component mounting surface 830. The component mounting surface 830 extends from the third planar portion 80c toward a side of the wiring board 800, and is bent so as to be accommodated in the holding space 225 for holding the IC 300 making use of a flexible property.

As described above, in the rotating device 1 according to the present embodiment, the IC 300 serving as the electronic component is held in a pinched manner by the plurality of holding portions, that is, by the convex portions 227 formed on the inner wall surface of the casing 2 and the pinching members 810.

Accordingly, the IC 300 can be prevented from being damaged, or the IC 300 can keep the electrical connection to the wiring board 800.

The third embodiment described above provides the rotating device 1 described below.

(19) The rotating device 1 includes the casing 2, the motor 3, the gear (the transmission gears 6 and the output gear 5) for transmitting the rotation of the motor 3 to an external device, the sensor 7, the connection terminals (the first connection terminals 74 and the second connection terminals 40) to be electrically connected to an external device, and the wiring board 800 for electrically connecting together the motor 3, the sensor 7, and the connection terminals (the first connection terminals 74 and the second connection terminals 40), the rotational angle of the output gear 5 being detectable by the sensor 7; the IC 300 serving as the electronic component for controlling the operation of the motor 3 is mounted on the wiring board 800; and the IC 300 is held by the casing 2.

With the above-described rotating device 1, the IC 300 can be prevented from being damaged, or the IC 300 can keep the electrical connection to the wiring board 800.

(20) In the rotating device 1 described in (19) above, the wiring board 800 is formed of the flexible film.

With the above-described rotating device 1, the flexibility of arrangement of the IC 300 increases, so that the IC 300 can be restrained from being damaged, and the IC 300 can keep the electrical connection to the wiring board 800.

(21) In the rotating device 1 described in (19) or (20) above, the IC 300 serving as the electronic component is electrically connected to the connection terminals (the first connection terminals 74 and the second connection terminals 40) through the wiring board 800.

With the above-described rotating device 1, the wiring board 800 can further absorb, for example, the externally applied vibration, so that the solder for connecting the IC 300 to the wiring can be prevented from separating from the IC 300.

(22) In the rotating device 1 described in any one of (19) to (21) above, the casing 2 includes the plurality of holding portions 230 for holding the IC 300.

With the above-described rotating device 1, the IC 300 can be more reliably held.

(23) In the rotating device 1 described in (22) above, the plurality of holding portions 230 include the inner wall surface of the casing 2 or the convex portions 227 projecting from the inner wall surface.

With the above-described rotating device 1, the IC 300 can be more reliably held.

(24) In the rotating device 1 described in (22) or (23) above, one of the plurality of holding portions 230 is formed of an elastic member (pinching member 810) including more elasticity than members forming the other holding portion 230.

With the above-described rotating device 1, transmission of the vibration to the IC 300 can be further reduced.

(25) In the rotating device 1 described in (22) or (23) above, one or two or more holding portions 230 of the plurality of holding portions 230 are a part of the casing 2 (second casing 22), and the IC 300 is elastically held in the casing 2 (second casing 22) by the one or two or more holding portions 230.

(26) In the rotating device 1 described in any one of (22) to (25) above, the IC 300 is held in a pinched manner by the plurality of holding portions 230.

With the above-described rotating device 1, the IC 300 can be more reliably protected.

In the first to third embodiments described above, the two terminals of the linear first connection terminal 74 and the second connection terminal 40 including the shape illustrated in FIG. 3 are used as the connection terminals.

In other words, the first connection terminal 74 includes the first end portion connected to the sensor 7 and the second end portion to be electrically connected to an external device, and the second connection terminal 40 is electrically connected, directly or through another member, to the first connection terminal 74.

In this way, the configuration includes the linear first connection terminal 74 with the second end portion connected to an external device and the second connection terminal 40 connected to the first connection terminal 74 through a connecting member, such as the wiring board 8, 80, or 800. Accordingly, the flexibility of designing the casing 2 in the rotating device 1 increases, and the casing 2 can be reduced in size.

In the first to third embodiments described above, the terminal including the shape illustrated in FIG. 3, that is, the terminal formed by punching the metal plate material into the predetermined shape is used as the second connection terminal 40.

However, instead of the above-described configuration, a configuration described below can be employed as the second connection terminal.

[Modification]

Figure 16:
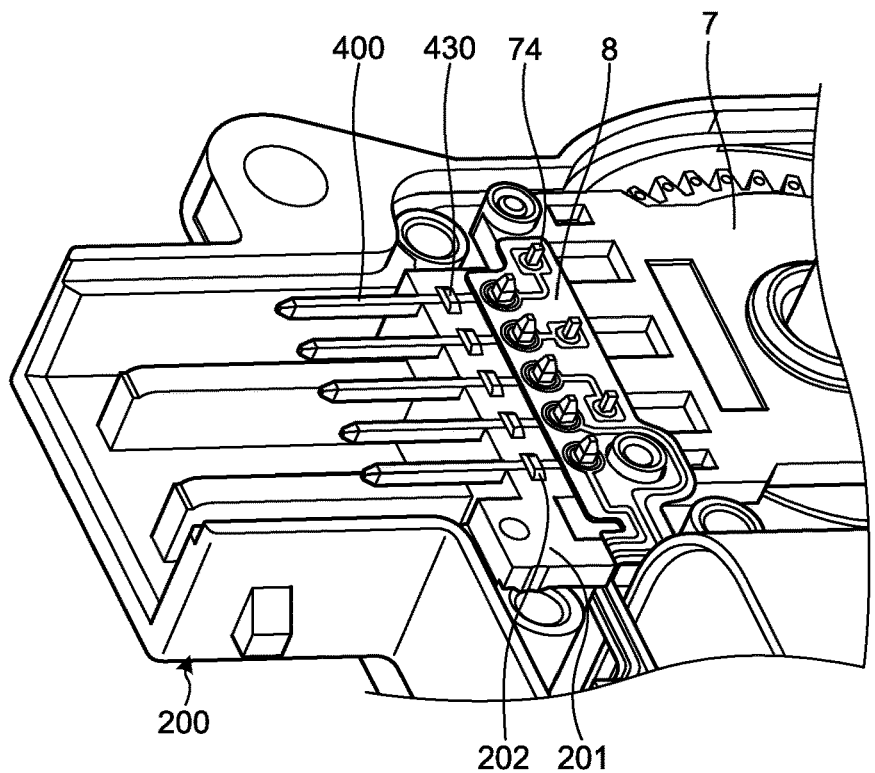
FIG. 16 is an explanatory view illustrating a connector portion of the rotating device according to a modification.
Figure 17:
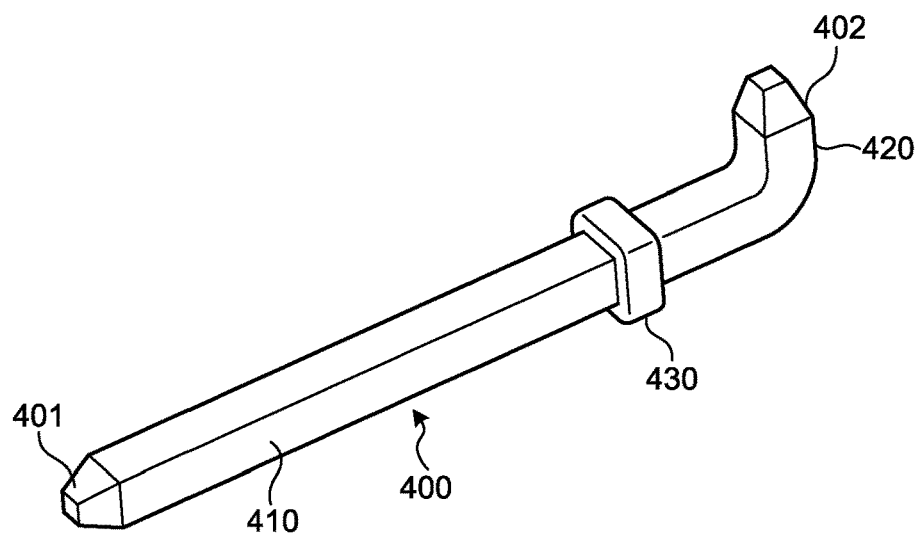
FIG. 17 is a perspective view of a connection terminal provided at the connector portion of the rotating device according to the modification.
Figure 18:
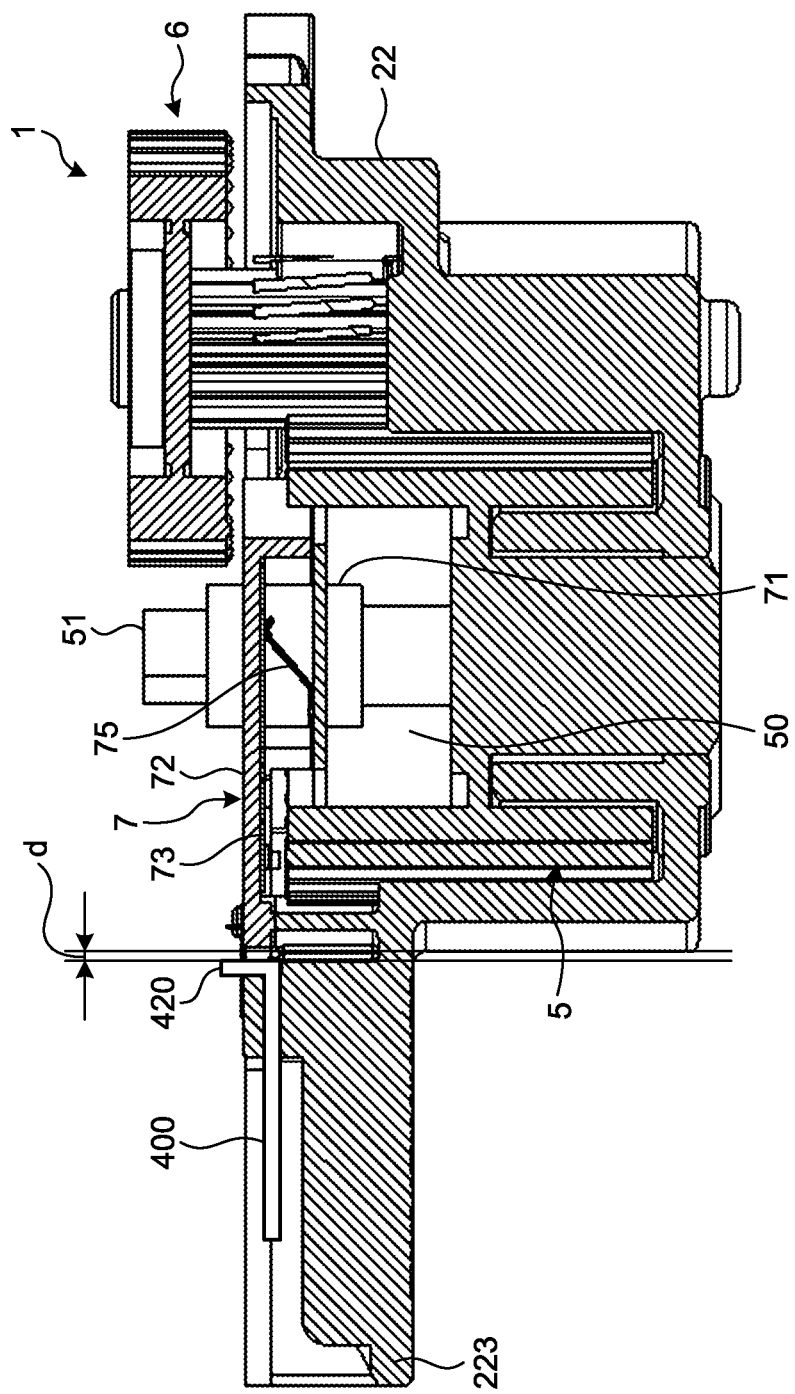
FIG. 18 is an explanatory view represented as a sectional view illustrating a positional relation between the above-mentioned connection terminal and the sensor housing.

FIG. 16 is an explanatory view illustrating the connector portion 200 of the rotating device 1 according to a modification. FIG. 17 is a perspective view of a second connection terminal provided at the connector portion 200 of the rotating device 1 according to the modification. FIG. 18 is an explanatory view represented as a sectional view illustrating a positional relation between the above-mentioned second connection terminal and the sensor housing 72.

As illustrated in FIGS. 16 and 17, a second connection terminal 400 according to the modification is formed of a rod-like member including a quadrangular sectional shape, and includes a bent portion 420 formed on a first end portion side of the second connection terminal 400 and an extending portion (a part of the second connection terminal 400) 410 linearly extending from the bent portion 420 over to the second end portion of the second connection terminal 400. The second end portion of the second connection terminal 400 (hereinafter, called a distal end portion of the extending portion 410) 401 and first end portion of the second connection terminal 400 (hereinafter, called a distal end portion of the bent portion 420-side) 402 each include a slightly tapered substantially quadrangular pyramid shape. Since the extending portion 410 of the second connection terminal 400 is located in an intermediate position between the first end portion 402 and the second end portion 401, the extending portion also serves as an intermediate portion.

As illustrated in FIG. 16, the bent portion 420 extends in a direction away from the bottom surface of the casing 2, that is, the second casing 22. On the other hand, as illustrated in FIGS. 7A and 7B, the bent portion 74a is formed on the second end portion side of the first connection terminal 74, and the distal end portion on the bent portion 74a side extends in a direction away from the second surface portion 220 serving as the bottom surface of the second casing 22. In other words, the distal end portion 402 of bent portion 420-side of the second connection terminal 400 extends in the same direction as the distal end portion of the first connection terminal 74.

Accordingly, the first connection terminal 74 can be easily connected to the second connection terminal 400 by connecting the end portion on the bent portion 74a side of the first connection terminal 74 to the end portion on bent portion 420-side of the second connection terminal 400 using the wiring board 8, 80, or 800 formed of the flexible film. As described in the above embodiments, the motor 3 can also be electrically connected to the second connection terminal 400 using the wiring board 8, 80, or 800.

As illustrated in FIG. 18, the bent portion 420 of the second connection terminal 400 is close to the sensor housing 72 to such a degree as to include a predetermined gap d from the sensor housing 72. The gap d is very small in the present embodiment. The bent portion 420, the second end portion of the first connection terminal 74, and the sensor housing 72 are arranged side by side and adjacent to one another in a direction from the first connection terminal 74 toward the second connection terminal 400.

Since such a configuration can be achieved, the flexibility of design including the size of the casing 2 does not decrease as in cases of, for example, conventional rotating devices (refer, for example, Japanese Patent Application Laid-open No. 2013-5512). In such conventional rotating devices, a connection terminal extending from a sensor is set to include a predetermined length in advance. Thus, the present configuration can contribute to the reduction in size of the casing 2, and in turn, to the reduction in size of the rotating device 1.

As illustrated in FIG. 17, a flange 430 is provided on the extending portion 410 near the bent portion 420 of the second connection terminal 400. As illustrated in FIG. 16, on the other hand, the holding portions 201 provided at the connector portion 200 formed on the casing 2 are provided with a predetermined number (five, in this case) of recesses 202 for arranging the flanges 430 included in the second connection terminals 400 in the accommodated state. The second connection terminals 400 are held in a state where the flanges 430 are inserted in the recesses 202. Accordingly, the second connection terminals 400 are firmly held by the casing 2.

The rotating device 1 described below is provided by using the second connection terminals 400 according to the above-described modification.

(27) The rotating device 1 includes the motor 3, the gear (the transmission gears 6 and the output gear 5) for transmitting the rotation of the motor 3 to an external device, the sensor 7, the plurality of linear connection terminals (for example, the first connection terminals 74 and the second connection terminals 400), and the casing 2 that accommodates the gear (the transmission gears 6 and the output gear 5), the sensor 7, and the connection terminals (for example, the first connection terminals 74 and the second connection terminals 400), the rotational angle or a rotational speed of the output gear 5 being detectable by the sensor 7; the connection terminals 74 of the plurality of connection terminals each include the first end portion connected, directly or through another member, to the sensor 7, and the second end portion to be electrically connected to an external device; and the connection terminals 40 of the other of the plurality of connection terminals each include the first end portion 402 connected, directly or through another member, to the motor 3 and the second end portion 401 to be electrically connected to an external device.

Alternatively, the rotating device 1 includes the motor 3, the gear (the transmission gears 6 and the output gear 5) for transmitting the rotation of the motor 3 to an external device, the sensor 7 that detects the rotational angle of the output gear 5, and the linear first connection terminals 74 and the second connection terminals 400, each of the first connection terminals 74 including the first end portion connected to the sensor 7 and the second end portion to be electrically connected to an external device; each of the second connection terminals 400 is electrically connected, directly or through another member, to the first connection terminal 74; and in addition, the second connection terminal 400 includes the bent portion 420 formed on the first end portion side of the second connection terminal 400 and the extending portion 410 that is the part linearly extending from the bent portion 420 over to the second end portion (distal end portion 401) of the second connection terminal 400.

With the above-described rotating device 1, the flexibility of designing the casing 2 in the rotating device 1 increases, and the casing 2 can be reduced in size.

(28) In the rotating device 1 described in (27) above, the other member is the wiring board.

With the above-described rotating device 1, a conventional product can be used as it is without newly preparing a dedicated connecting member, and the cost can be reduced.

(29) In the rotating device 1 described in (27) or (28) above, each of the plurality of connection terminals 400 includes the flange 430 at the intermediate portion between the first end portion 402 and the second end portion 401.

With the above-described rotating device 1, the linear second connection terminal 400 can be improved in strength.

(30) In the rotating device 1 described in (29) above, the casing 2 is provided with the recesses 202, and the flanges 430 of the plurality of second connection terminals 400 engage with the recesses 202.

With the above-described rotating device 1, the second connection terminals 400 can be reliably held in the casing 2.

(31) The rotating device 1 described in (30) above includes the bent portion 420 between the flange 430 and the first end portion 402.

With the above-described rotating device 1, for example, a predetermined connecting member, such as the wiring board 8, 80, or 800, can be used to easily connect the bent portion 74a of the first connection terminal 74 to the bent portion 420 of the second connection terminal 400, and also to easily electrically connect the first connection terminal 74 to the second connection terminal 400.

(32) In the rotating device 1 described in any one of (28) to (31) above, the wiring board is formed of the flexible film.

With the above-described rotating device 1, the wiring board 8, 80, or 800 can absorb, for example, the externally applied vibration while providing the above-described advantages. Accordingly, the solder for connecting the first connection terminals 74 and the second connection terminals 400 to the wiring board 8, 80, or 800 can be prevented from, for example, separating from the connection terminals.

(33) In the rotating device 1 described in any one of (28) to (32) above, the sensor 7 includes the sensor board 73 including the conductive portion 730, and the wiring board 8, 80, or 800 is electrically connected to the sensor board 73.

With the above-described rotating device 1, a configuration is also possible, for example, that the wiring board 8, 80, or 800 may be directly electrically connected to the conductive portion 730 of the sensor board 73 without the connection terminals 74 or the like.

(34) In the rotating device 1 described in any one of (28) to (32) above, the sensor 7 includes the sensor board 73 and the first connection terminals 74 electrically connected to the sensor board 73, and the first connection terminals 74 are electrically connected to the wiring board, 80 or 800.

With the above-described rotating device 1, a configuration is also possible, for example, that the sensor board 73 may be packaged with the first connection terminals 74 to provide the easy-to-handle sensor 7.

The rotating device 1 described below is further provided by using the second connection terminals 400 according to the modification.

(35) In the rotating device 1 described in (31) above, the bent portion 420 extends in the direction away from the bottom of the casing 2 (the second surface portion 220 serving as the bottom wall of the second casing 22).

With the above-described rotating device 1, the predetermined connecting member can be used to easily connect the bent portion 74a of the first connection terminal 74 to the bent portion 420 of the second connection terminal 400, and also to easily electrically connect the first connection terminal 74 to the second connection terminal 400.

(36) In the rotating device 1 described in any one of (27) to (35) above, the sensor 7 includes the sensor housing 72, and the bent portion 420 of the second connection terminal 400, the second end portion of the first connection terminal 74, and the sensor housing 72 are arranged side by side in the direction from the first connection terminal 74 toward the second connection terminal 400.

With the above-described rotating device 1, as a result, the sensor housing 72 can be made as close as possible to the second connection terminal 400, so that this configuration can contribute to the reduction in size of the casing 2, and in turn, to the reduction in size of the rotating device 1.

While the present invention has been described above based on the embodiments, the present invention is not limited to the embodiments, and can naturally be variously changed within the scope not deviating from the gist of the present invention. Such various changes within the scope not deviating from the gist are also included in the technical scope of the present invention, and apparent to those skilled in the art from the description of the claims.

In each of the embodiments, the sensor part can detect the rotational angle of the gear. However, the sensor part is not limited to this sensor part, and may be capable of detecting the rotational angle and/or the rotational speed of the gear.

In each of the embodiments, the wiring provided on the wiring board may be electrically connected to the conductive portion provided on the board of the sensor (sensor board) using a known method, such as the soldering, without the connection terminals. Alternatively, the wiring board may be fixed to the board of the sensor using, for example, a resin to make the wiring of the wiring board in contact with and electrically connected to the conductive portion of the sensor board without the connection terminals.

REFERENCE SIGNS LIST

1 Rotating device
2 Casing
3 Motor
4 Worm gear
5 Output gear
6 Transmission gear
7 Sensor
8, 80, 800 Wiring board
21 First casing
22 Second casing
23, 24, 25, 26 Mounting portion
40 Second connection terminal
40a Piece
70 Sensor part
73 Sensor board
75 Brush
72 Sensor housing
91 Projection
92 Through-hole
210 First surface portion
211 First sidewall
220 Second surface portion
222 Second sidewall
224 Engagement projection
212 Engagement portion
213, 223 Projecting portion
200 Connector portion
100 Air conditioning system
101 Blower fan
102 Evaporator
103 Heater
104 Louver
104a Drive shaft
74 First connection terminal
74a Bent portion
61 First transmission gear
62 Second transmission gear
51 Output shaft
30 Body
31 Rotating shaft
33 Terminal
611 First large diameter portion
612 First small diameter portion
621 Second small diameter portion
622 Second large diameter portion
50 Recess
52 Tooth row
53 Bottom
72a First side portion
72b Second side portion
723 First circular hole
711 Boss
712 Fitting hole
721 Rectangular hole
730 Conductive portion
73a Circular portion
73b Rectangular portion
733 Second circular hole
735 Hole
731 Output part
732 Resistor part
751, 752 Contact
734a Led-out portion
734b First led-out portion
734c Second led-out portion
201 Holding portion
81 First planar portion
82 Second planar portion
83 Third planar portion
11a to 11d Rod-like body
11 Jig
110 Support base
300 IC
80a First planar portion
80c Third planar portion
80b Second planar portion
225 Holding space
230 Holding portion
227 Convex portion
810 Pinching member
830 Component mounting surface
400 Second connection terminal
420 Bent portion
410 Extending portion
401, 402 End portion

The invention claimed is:

1. A rotating device comprising:
   a motor;
   a plurality of gears;
   a sensor;
   a casing including a connector portion, the casing being configured to accommodate the motor, the plurality of gears, and the sensor;
   wherein a connection terminal of the connector portion is configured to be electrically connected to the sensor;
   wherein the sensor includes:
   a brush;
   a conductive portion in contact with the brush;
   a board;
   wherein the conductive portion is provided at the board;
   a sensor housing configured to accommodate the brush and the board; wherein the connection terminal of the connector portion includes a first end portion and a second end portion, wherein the first end portion is configured to be electrically connected to the conductive portion of the sensor; and
   the second end portion is configured to be electrically connected to an external device; and
      wherein in a longitudinal axis direction of the connection terminal of the connector portion, the first end portion of the connection terminal of the connector portion and the board of the sensor are placed in a row and oppose one another.

2. The rotating device according to claim 1, wherein
   an end surface of the first end portion of the connection terminal of the connector portion and an end surface of the board of the sensor are placed in a row and oppose one another in the longitudinal axis direction of the connection terminal of the connector portion.

3. The rotating device according to claim 1, wherein
   the first end portion of the connection terminal of the connector portion, a part of the sensor housing, and a lead-out portion of the conductive portion of the sensor are placed in a row in the longitudinal axis direction of the connection terminal of the connector portion.

4. The rotating device according to claim 1, wherein the sensor is configured to detect a rotational angle of a gear of the plurality of gears.

5. The rotating device according to claim 1, wherein
   the sensor housing includes a rotational plate, wherein the brush is configured to be fixed to the rotational plate.

6. A rotating device according to claim 1, wherein the connection terminal of the connector portion electrically connects to the sensor via a flexible wiring board.

7. A vehicle, comprising:
   an air conditional system, wherein
   the air conditional system includes the rotating device according to claim 1 and a louver controlled by the rotating device.

* * * * *